United States Patent
Wu et al.

(10) Patent No.: US 9,659,204 B2
(45) Date of Patent: May 23, 2017

(54) IMAGE PROCESSING METHODS AND SYSTEMS FOR BARCODE AND/OR PRODUCT LABEL RECOGNITION

(71) Applicant: Xerox Corporation, Norwalk, CT (US)

(72) Inventors: Wencheng Wu, Webster, NY (US); Dennis L. Venable, Marion, NY (US); Steven R. Moore, Pittsford, NY (US); Thomas F. Wade, Rochester, NY (US); Peter Paul, Webster, NY (US); Adrien P. Côté, Clarkson, OH (US)

(73) Assignee: Conduent Business Services, LLC, Dallas, TX (US)

( * ) Notice: Subject to any disclaimer, the term of this patent is extended or adjusted under 35 U.S.C. 154(b) by 119 days.

(21) Appl. No.: 14/303,724

(22) Filed: Jun. 13, 2014

(65) Prior Publication Data

US 2015/0363625 A1 Dec. 17, 2015

(51) Int. Cl.
*G06K 9/46* (2006.01)
*G06K 9/62* (2006.01)
*G06K 7/14* (2006.01)

(52) U.S. Cl.
CPC .......... *G06K 7/146* (2013.01); *G06K 7/1443* (2013.01); *G06K 7/1447* (2013.01); *G06K 9/46* (2013.01); *G06K 9/4604* (2013.01); *G06K 2009/4666* (2013.01)

(58) Field of Classification Search
CPC .......................................... G06K 7/14–7/1495
See application file for complete search history.

(56) References Cited

U.S. PATENT DOCUMENTS

| | | |
|---|---|---|
| 5,512,739 A | 4/1996 | Chandler et al. |
| 6,473,122 B1 | 10/2002 | Kanekal |
| 6,814,290 B2 | 11/2004 | Longacre |
| 7,066,291 B2 | 6/2006 | Martins et al. |
| 7,290,707 B2 | 11/2007 | Sawasaki |
| 7,386,163 B2 | 6/2008 | Sabe et al. |
| 7,574,378 B2 | 8/2009 | Lipowitz et al. |
| 7,693,757 B2 | 4/2010 | Zimmerman |
| 8,189,855 B2 | 5/2012 | Opalach et al. |
| 8,326,069 B2 | 12/2012 | Maslov et al. |
| 9,298,997 B1 * | 3/2016 | Lecky .................. G06K 9/3216 |

(Continued)

OTHER PUBLICATIONS

Adelmann et al., "Toolkit for Bar Code Recognition and Resolving on Camera Phones—Jump-Starting the Internet of Things", Informatik Workshop on Mobile and Embedded Interactive Systems, 2006.

(Continued)

*Primary Examiner* — Brian P Werner
(74) *Attorney, Agent, or Firm* — Fay Sharpe LLP

(57) ABSTRACT

This disclosure provides an image processing method and system for recognizing barcodes and/or product labels. According to an exemplary embodiment, the method uses a multifaceted detection process that includes both image enhancement of a candidate barcode region and other product label information associated with a candidate barcode region to identify a product label, where the candidate barcode region includes a nonreadable barcode. According to one exemplary application, a store profile is generated based on the identifications of the product labels which are associated with a location of a product within a store.

21 Claims, 11 Drawing Sheets

(56) References Cited

U.S. PATENT DOCUMENTS

| | | | |
|---|---|---|---|
| 2002/0141640 | A1 | 10/2002 | Kraft |
| 2002/0196979 | A1* | 12/2002 | Yen ..................... G06K 7/1443 382/190 |
| 2004/0120547 | A1* | 6/2004 | Mampe .................... B07C 3/12 382/101 |
| 2004/0218783 | A1* | 11/2004 | Mampe .................... B07C 3/14 382/101 |
| 2004/0233278 | A1 | 11/2004 | Prudhomme et al. |
| 2006/0202032 | A1 | 9/2006 | Kricorissian |
| 2009/0212113 | A1 | 8/2009 | Chiu et al. |
| 2009/0294533 | A1* | 12/2009 | Reardon ................ G07C 13/00 235/386 |
| 2010/0171826 | A1 | 7/2010 | Hamilton et al. |
| 2013/0193211 | A1* | 8/2013 | Baqai ................... G06K 7/1413 235/462.04 |
| 2013/0229517 | A1 | 9/2013 | Kozitsky et al. |
| 2013/0278761 | A1 | 10/2013 | Wu |
| 2013/0342706 | A1 | 12/2013 | Hoover et al. |
| 2014/0034736 | A1* | 2/2014 | Jia ....................... G06K 7/1443 235/462.25 |
| 2014/0218553 | A1 | 8/2014 | Deever |
| 2015/0144693 | A1* | 5/2015 | Li ...................... G06K 7/10722 235/437 |

OTHER PUBLICATIONS

Bailey, "Super-Resolution of Bar Codes", Journal of Electronic Imaging, vol. 10, No. 1, 2001, p. 213-220.
U.S. Appl. No. 14/303,735, filed Jun. 13, 2014, Wu et al.
U.S. Appl. No. 14/303,809, filed Jun. 13, 2014, Wu et al.
Ballard, "Generalizing the Hough Transform to Detect Arbitrary Shapes", Pattern Recognition, vol. 13, No. 2, 1981, p. 111-122.
Bodnár et al, "Barcode Detection With Uniform Partitioning and Morphological Operations", Conf. of PhD Students in Computer Science, 2012, p. 4-5.
Bodnár et al, "Improving Barcode Detection With Combination of Simple Detectors", Int'l Conf. on Signal Image Technology and Internet Based Systems, 2012.
Canny, "A Computational Approach to Edge Detection", IEEE Transactions on Pattern Analysis and Machine Intelligence, vol. PAMI-8, No. 6, 1986, p. 679-698.
Ebner et al., "Development and Testing of a Color Space (IPT) With Improved Hue Uniformity", Proceedings of IS&T/SID's Sixth Color Imaging Conf., 1998, p. 8-13.
Felzenszwalb et al., "Distance Transforms of Sampled Functions", Cornell Computing and Information Science, Tech. Rep., 2004.
Gonzalez et al., "Digital Image Processing", $3^{rd}$ Edition, Prentice Hall, 2008.
Hodges, "An Introduction to Video and Audio Measurement" More on Pictures, Chapter 13, Elsevier, 2004, see 174.
Hunt, "The Reproduction of Colour", John Wiley & Sons, 2004, p. 48.
Jain et al., "Bar Code Localization Using Texture Analysis", Proceedings of the Second Int'l Conf. on Document Analysis and Recognition, 1993, p. 41-44.
Joseph et al., "Bar Code Waveform Recognition Using Peak Locations", IEEE Transactions on Pattern Analysis and Machine Intelligence, vol. 16, No. 6, 1994, p. 630-640.
Juett, "Barcode Localization Using a Bottom Hat Filter", NSF Research Experience for Undergraduates, 2005.
Katona et al., "A Novel Method for Accurate and Efficient Barcode Detection With Morphological Operations", Eighth Int'l Conf. on Signal Image Technology and Internet Based Systems, 2012, p. 307-314.
Kiryati et al., "A Probabilistic Hough Transform", Pattern Recognition, vol. 24, No. 4, 1991, p. 303-316.
Kuroki et al., "Bar Code Recognition System Using Image Processing", Hitachi Process Computer Engineering, Inc., 1990.
Lin et al., "Multi-Symbology and Multiple 1D/2D Barcodes Extraction Framework", Advances in Multimedia Modeling, 2011, p. 401-410.
Lin et al., "Real-Time Automatic Recognition of Omnidirectional Multiple Barcodes and DSP Implementation", Machine Vision and Applications, vol. 22, 2011, p. 409-419.
Liyanage, "Efficient Decoding of Blurred, Pitched, and Scratched Barcode Images", Second Int'l Conf. on Industrial and Information Systems, 2007.
McKesson, "Linearity and Gamma—Chapter 12—Dynamic Range", http://www.arcsynthesis.org/gltut/Illumination/Tut12%20Monitors%20and%20Gamma.html, retrieved Jul. 11, 2013.
Muniz et al., "A Robust Software Barcode Reader Using the Hough Transform", Int'l Conf. on Information Intelligence and Systems, 1999, p. 313-319.
Normand et al., "A Two-Dimensional Bar Code Reader", $12^{th}$ Int'l Conf. on Pattern Recognition, vol. 3, 1994, p. 201-203.
Ohbuchi et al., "Barcode Readers Using the Camera Device in Mobile Phones", Proceedings of the 2004 Int'l Conf. on Cyberworlds, 2004.
Oktem et al., "A Superesolution Approach for Bar Code Reading", Electrical and Engineering Department, Atilim University, Turkey, 2002.
Oktem, "Bar Code Localization in Wavelet Domain by Using Binary", Proceedings of the IEEE $12^{th}$ Signal Processing and Communications Applications Conference, 2004, p. 499-501.
Pavlidis et al., "Fundamentals of Bar Code Information Theory", IEEE Computer Journal, vol. 23, No. 4, 1990, p. 74-86.
Poynton, "Digital Video and HDTV: Algorithms and Interfaces" Morgan Kaufman Publishers, 2003, p. 260, 630.
Poynton, "Frequently Questioned Answers About Gamma", www.poynton.com/notes/color/GammaFQA.html, 2010.
Reinhard et al., "High Dynamic Range Imaging: Acquisition, Display, and Image Based Lighting", Morgan Kaufmann Publishers, 2010, p. 82.
Tuinstra, "Reading Barcodes From Digital Imagery", Ph.D. dissertation, Cedarville University, 2006.
Wittman et al., "Super-Resolution of 1D Barcode Images", University of Minnesota, 2004.
Wu et al., "Automatic Thresholding of Gray-Level Using Multi-Stage Approach", Proceedings of the Seventh Int'l Conf. on Document Analysis and Recognition, 2003, p. 493-497.
Youssef et al., "Automated Barcode Recognition for Smart Identification and Inspection Automation", Expert Systems with Applications, vol. 33, No. 4, 2007, p. 968-977.
Zhang, "Flexible Camera Calibration by Viewing a Plane From Unknown Orientations", Int'l Conf. on Computer Vision, Corfu, Greece, 1999, p. 666-673.
Husky Unmanned Ground Vehicle, Clearpath Robotics, 2013, 2 pages.

* cited by examiner

IMAGE PROCESSING METHODS AND SYSTEMS FOR BARCODE AND/OR PRODUCT LABEL RECOGNITION

CROSS REFERENCE TO RELATED PATENTS AND APPLICATIONS

Cross-reference is made to the following copending applications, filed contemporaneously herewith: U.S. patent application Ser. No. 14/303,809, filed Jun. 13, 2014, by Wu et al., and entitled "STORE SHELF IMAGING SYSTEM" and U.S. patent application Ser. No. 14/303,735, filed Jun. 13, 2014, by Wu et al., and entitled "METHOD AND SYSTEM FOR SPATIAL CHARACTERIZATION OF AN IMAGING SYSTEM", the disclosures of which are incorporated herein by reference in their entireties.

BACKGROUND

This disclosure provides an image processing method and system for recognizing barcodes and/or product labels. According to an exemplary embodiment, the method uses a multifaceted detection process that includes both image enhancement of a candidate barcode region and other product label information associated with a candidate barcode region to identify a product label, where the candidate barcode region includes a nonreadable barcode. According to one exemplary application, a store profile is generated based on the identifications of the product labels which are associated with a location of a product within a store.

This disclosure also relates to product mapping and finds particular application in connection with a system and method for determining the spatial layout of product content of a product facility, such as a store.

Retail chains, such as pharmacy, grocery, home improvement, and others, may have a set of product facilities, such as stores, in which products are presented on product display units, such as shelves, cases, and the like. Product information is generally displayed close to the product, on preprinted product labels. The product labels indicate the price of the item and generally include a unique identifier for the product, e.g., in the form of a barcode, which is often used by the store for restocking and other purposes. Periodically, stores place some of the items on sale, or otherwise adjust prices. This entails printing of sale item labels and/or associated signage and manual replacement of the product labels and/or addition of associated signage. The printing and posting of such sale item signage within each store often occurs at weekly intervals.

It would be advantageous to each store if the signage was printed and packed in the order in which a store employee encounters the sale products while walking down each aisle. However, retail chains generally cannot control or predict the product locations across each of their stores. This may be due to a number of factors, such as store manager discretion, local product merchandising campaigns, different store layouts, and so forth. Thus, individual stores may resort to manually pre-sorting the signage into the specific order appropriate for that store, which can be time consuming and not always accurate.

Copending patent applications U.S. patent application Ser. No. 14/303,809, filed Jun. 13, 2014, by Wu et al., and entitled "Store Shelf Imaging System" and U.S. patent application Ser. No. 14/303,735, filed Jun. 13, 2014, by Wu et al., and entitled "Method and System for Spatial Characterization of Imaging System" provide a method and system for a chain of stores to be able to collect product location data automatically across its stores. Each store could then receive signage which has been automatically packaged in an appropriate order to avoid a pre-sorting step.

There exist many prior arts on barcode detection and/or recognition, see Péter Bodnár and László G. Nyúl, "Improving Barcode Detection with Combination of Simple Detectors," 2012 Eighth International Conference on Signal Image Technology and Internet Based Systems (2012) and J. Liyanage, "Efficient Decoding of Blurred, Pitched, and Scratched Barcode Images," Second International Conference on Industrial and Information Systems (ICIIS 2007), August, (2007), and citations of them. They can perform quite well with sufficient image resolution and high image quality (no motion blur, no out of focus, good and uniform illumination . . . ). In practice, high quality imaging is not always feasible or affordable. As a result, barcode recognition is still a fairly active research area focusing on solving real-world problems even though it may seem straightforward. See Péter Bodnár and László G. Nyúl, "Improving Barcode Detection with Combination of Simple Detectors," 2012 Eighth International Conference on Signal Image Technology and Internet Based Systems (2012) and J. Liyanage, "Efficient Decoding of Blurred, Pitched, and Scratched Barcode Images," Second International Conference on Industrial and Information Systems (ICIIS 2007), August, (2007). For a retail application as disclosed in U.S. patent application Ser. No. 14/303,809 filed Jun. 13, 2014, by Wu et al., and entitled "Store Shelf Imaging System", high throughput and broad spatial coverage, i.e., the entire store, are required where 15000 barcodes or more covering the entire store need to be recognized in a relatively short time-frame, e.g., 4-8 hours. This makes the matter worse since maintaining high quality imaging over a large spatial area while achieving such throughput is not a simple task. Hence improvement on existing barcode detection and recognition methods is needed.

INCORPORATION BY REFERENCE

Adelmann et al., "Toolkit for Bar Code Recognition and Resolving on Camera Phones—Jump-Starting the Internet of Things", Informatik Workshop on Mobile and Embedded Interactive Systems, 2006;

Bailey, "Super-Resolution of Bar Codes", Journal of Electronic Imaging, Vol. 10, No. 1, 2001, p 213-220;

Ballard, "Generalizing the Hough Transform to Detect Arbitrary Shapes", Pattern Recognition, Vol. 13, No. 2, 1981, p 111-122;

Bodnár et al, "Barcode Detection With Uniform Partitioning and Morphological Operations", Conf. of PhD Students in Computer Science, 2012, p 4-5;

Bodnár et al, "Efficient Barcode Detection With Texture Analysis", Proceedings of the Ninth IASTED Int'l Conf. on Signal Processing, Pattern Recognition, and Applications", 2012, p 51-57;

Bodnár et al, "Improving Barcode Detection With Combination of Simple Detectors", Int'l Conf. on Signal Image Technology and Internet Based Systems, 2012;

Canny, "A Computational Approach to Edge Detection", IEEE Transactions on Pattern Analysis and Machine Intelligence, Vol. PAMI-8, No. 6, 1986, p 679-698;

Ebner et al., "Development and Testing of a Color Space (IPT) With Improved Hue Uniformity", Proceedings of IS&T/SID's Sixth Color Imaging Conf., 1998, p. 8-13;

Felzenszwalb et al., "Distance Transforms of Sampled Functions", Cornell Computing and Information Science, Tech. Rep., 2004.

Gonzalez et al., "Digital Image Processing", 3rd Edition, Prentice Hall, 2008;

Hodges, "An Introduction to Video and Audio Measurement", Elsevier, 2004, p 174;

Hunt, "The Reproduction of Colour", John Wiley & Sons, 2004, p 48;

Jain et al., "Bar Code Localization Using Texture Analysis", Proceedings of the Second Int'l Conf. on Document Analysis and Recognition, 1993, p 41-44;

Joseph et al., "Bar Code Waveform Recognition Using Peak Locations", IEEE Transactions on Pattern Analysis and Machine Intelligence, Vol. 16, No. 6, 1994, p 630-640;

Juett, "Barcode Localization Using a Bottom Hat Filter", NSF Research Experience for Undergraduates, 2005;

Katona et al., "A Novel Method for Accurate and Efficient Barcode Detection With Morphological Operations", Eighth Int'l Conf. on Signal Image Technology and Internet Based Systems, 2012, p 307-314;

Kiryati et al., "A Probabilistic Hough Transform", Pattern Recognition, Vol. 24, No. 4, 1991, p 303-316;

Kuroki et al., "Bar Code Recognition System Using Image Processing", Hitachi Process Computer Engineering, Inc., 1990;

Lin et al., "Multi-Symbology and Multiple 1D/2D Barcodes Extraction Framework", Advances in Multimedia Modeling, 2011, p 401-410;

Lin et al., "Real-Time Automatic Recognition of Omnidirectional Multiple Barcodes and DSP Implementation", Machine Vision and Applications, Vol. 22, 2011, p 409-419;

Liyanage, "Efficient Decoding of Blurred, Pitched, and Scratched Barcode Images", Second Int'l Conf. on Industrial and Information Systems, 2007;

McKesson, "Linearity and Gamma—Chapter 12—Dynamic Range", http://www.arcsynthesis.org/gltut/Illumination/Tut12%20Monitors%20and%20Ga mma.html, retrieved Jul. 11, 2013;

Muniz et al., "A Robust Software Barcode Reader Using the Hough Transform", Int'l Conf. on Information Intelligence and Systems, 1999, p 313-319;

Normand et al., "A Two-Dimensional Bar Code Reader", 12th Int'l Conf. on Pattern Recognition, Vol. 3, 1994, p 201-203;

Ohbuchi et al., "Barcode Readers Using the Camera Device in Mobile Phones", Proceedings of the 2004 Int'l Conf. on Cyberworlds, 2004;

Oktem et al., "A Superesolution Approach for Bar Code Reading", Electrical and Engineering Department, Atilim University, Turkey, 2002;

Oktem, "Bar Code Localization In Wavelet Domain By Using Binary", Proceedings of the IEEE 12th Signal Processing and Communications Applications Conference, 2004, p 499-501;

Pavlidis et al., "Fundamentals of Bar Code Information Theory", IEEE Transactions on Pattern Analysis and Machine Intelligence, Vol. 16, No. 6, 1994, p. 630-640;

Poynton, "Digital Video and HDTV: Algorithms and Interfaces" Morgan Kaufman Publishers, 2003, p 260, 630;

Poynton, "Frequently Questioned Answers About Gamma", www.poynton.com/notes/color/GammaFQA.html, 2010;

Reinhard et al., "High Dynamic Range Imaging: Acquisition, Display, and Image-Based Lighting", Morgan Kaufmann Publishers, 2010, p 82.

Tuinstra, "Reading Barcodes From Digital Imagery", Ph.D. dissertation, Cedarville University, 2006;

Wittman et al., "Super-Resolution of 1D Barcode Images", University of Minnesota, 2004;

Wu et al., "Automatic Thresholding of Gray-Level Using Multi-Stage Approach", Proceedings of the Seventh Int'l Conf. on Document Analysis and Recognition, 2003, p 493-497;

Youssef et al., "Automated Barcode Recognition for Smart Identification and Inspection Automation", Expert Systems with Applications, Vol. 33, No. 4, 2007, p 968-977;

Zhang, "Flexible Camera Calibration By Viewing a Plane From Unknown Orientations", Int'l Conf. on Computer Vision, Corfu, Greece, 1999, p 666-673;

U.S. Pat. No. 5,512,739, granted on Apr. 30, 1996, to Chandler et al. and entitled "DUAL PROCESSOR OMNIDIRECTIONAL BAR CODE READER WITH DUAL MEMORY FOR BAR CODE LOCATION AND ORIENTATION";

U.S. Pat. No. 7,066,291, granted on Jun. 27, 2006, to Martins et al. and entitled "ROBOT SYSTEM";

U.S. Pat. No. 7,290,707, granted Nov. 6, 2007, to Sawasaki and entitled "TELE-INVENTORY SYSTEMS AND IN-SHOP TERMINAL AND REMOTE MANAGEMENT APPARATUS FOR THE SYSTEM";

U.S. Pat. No. 7,386,163, granted Jun. 10, 2008, and entitled. "OBSTACLE RECOGNITION APPARATUS AND METHOD, OBSTACLE RECOGNITION PROGRAM, AND MOBILE ROBOT APPARATUS";

U.S. Pat. No. 7,693,757, granted Apr. 6, 2010, to Zimmerman and entitled "SYSTEM AND METHOD FOR PERFORMING INVENTORY USING A MOBILE INVENTORY ROBOT";

U.S. Pat. No. 8,189,855, granted May 29, 2012, to Opalach et al. and entitled "PLANOGRAM EXTRACTION BASED ON IMAGE PROCESSING";

U.S. Published Patent App. No. 2013-0342706, published on Dec. 26, 2013, to Hoover et al. and entitled "CAMERA CALIBRATION APPLICATION";

U.S. Published Patent App. No. 2013-0229517, published on Sep. 5, 2013 to Kozitsky et al. and entitled "VEHICLE SPEED MEASUREMENT METHOD AND SYSTEM UTILIZING A SINGLE IMAGE CAPTURING UNIT";

U.S. Published Patent App. No. 2013-0342706, published on Dec. 26, 2013, to Hoover et al. and entitled "CAMERA CALIBRATION APPLICATION";

U.S. Published Patent App. No. 2013-0278761, published on Oct. 24, 2013, to Wu and entitled "REAL-TIME VIDEO TRIGGERING FOR TRAFFIC SURVEILANCE AND PHOTO ENFORCEMENT APPLICATIONS USING NEAR INFRARED VIDEO ACQUISITION", are incorporated herein by reference in their entirety.

BRIEF DESCRIPTION

In one embodiment of this disclosure, described is a method of performing decoding of a barcode associated with a product label, the product label including one or more barcodes and other product label information, the method comprising: an image capturing device capturing an image of the product label and storing the captured image in a memory operatively associated with the image capturing device; a processor operatively associated with the memory detecting and localizing one or more barcode candidate regions within the captured image of the product label, the barcode candidate regions including a substantially fewer number of pixels relative to a total number of pixels included in the captured pixel image of the product label; cropping the detected and localized one or more barcode candidate regions to generate one or more sub-images including images of the one or more barcode candidate regions;

processing each sub-image using two or more independent image quality improvement processes to generate modified versions of the barcode candidate regions; and processing the modified versions of the barcode candidate regions to decode readable barcodes included in the modified versions of the candidate barcode regions.

In another embodiment of this disclosure, described is an image processing system for performing decoding of a barcode associated with a product label, the product label including one or more barcodes and other product label information, the image processing system comprising: an image capturing device; and a processor operatively connected to the image capturing device, the processor configured to: the image capturing device capturing an image of the product label and storing the captured image in a memory operatively associated with the image capturing device; the processor operatively associated with the memory detecting and localizing one or more barcode candidate regions within the captured image of the product label, the barcode candidate regions including a substantially fewer number of pixels relative to a total number of pixels included in the captured pixel image of the product label; cropping the detected and localized one or more barcode candidate regions to generate one or more sub-images including images of the one or more barcode candidate regions; processing each sub-image using two or more independent image quality improvement processes to generate modified versions of the barcode candidate regions; and processing the modified versions of the barcode candidate regions to decode readable barcodes included in the modified versions of the candidate barcode regions.

In still another embodiment of this disclosure, described is a method of performing product label identification, the product label including one or more barcodes and other product label information, the method comprising: an image capturing device capturing an image of the product label and storing the captured image in a memory operatively associated with the image capturing device; a processor operatively associated with the memory detecting and localizing one or more barcode candidate regions within the captured image of the product label; cropping the detected and localized one or more barcode candidate regions to generate one or more sub-mages including the one or more barcode candidate regions; processing each sub-image to decode readable barcodes included in the barcode candidate regions and identify barcode candidate regions including an unreadable barcode; processing all or a portion of the captured image of the product label associated with the unreadable barcode to determine all or part of the other product label information association with the unreadable barcode; comparing the determined other product label information to a plurality of product label templates to determine a layout associated with the product label including an unreadable barcode candidate region; processing the captured image of the product label to extract all or part of the other product label information based on the determined layout associated with the product label; and identifying the captured image of the product label as including one of a plurality of unique predefined product labels.

In still yet another embodiment, disclosed is an image processing system for performing product label identification, the product label including one or more barcodes and other product label information, the image processing system comprising: an image capturing device; and a processor operatively connected to the image capturing device, the processor configured to: the image capturing device capturing an image of the product label and storing the captured image in a memory operatively associated with the image capturing device; the processor operatively associated with the memory detecting and localizing one or more barcode candidate regions within the captured image of the product label; cropping the detected and localized one or more barcode candidate regions to generate one or more sub-images including the one or more barcode candidate regions; processing each sub-image to decode readable barcodes included in the barcode candidate regions and identify barcode candidate regions including an unreadable barcode; processing all or a portion of the captured image of the product label associated with the unreadable barcode to determine all or part of the other product label information association with the unreadable barcode; comparing the determined other product label information to a plurality of product label templates to determine a layout associated with the product label including an unreadable barcode candidate region; processing the captured image of the product label to extract all or part of the other product label information based on the determined layout associated with the product label; and identifying the captured image of the product label as including one of a plurality of unique predefined product labels.

DETAILED DESCRIPTION

This disclosure provides a method and system to improve the optical detection of barcodes in a multi-camera system that determines the layout of a store. The method utilizes a multifaceted detection approach that includes both image enhancement and auxiliary information to improve on current optical barcode detection methods. The method first employs a simple method to detect and crop candidate barcodes from the captured camera image. These candidate regions are then analyzed by an optical barcode reader;

segments that are correctly read are used to update a store layout map. If a candidate area fails to be detected by the optical reader the area is processed using several simple image enhancements methods (e.g. gamma correction) and resubmitted to the reader. If the enhanced cropped areas still fails barcode detection, the area around the code is processed for a-priori contextual information. Such information may include objects such as item description text or price/sale signs (e.g. yellow or red price boxes). The contextual information is compared against a database to determine a product match. If a unique match is found, this is used to identify the product to update the store layout map. If non-unique matches are found, a list of possible products with corresponding confidence measures are provided as additional information to the store layout map.

With reference to FIGS. 1-5, where the same numbers are used for similar elements, a mobile profile generation system 10 is configured for determining a spatial layout 12 (FIG. 5) of the product content of a product facility, such as a retail store, warehouse, or the like. The spatial layout may be referred to herein as a store profile. The store profile 12 may be in the form of a 2-dimensional or 3-dimensional plan of the store which indicates the locations of products, for example, by providing product data for each product, such as an SKU or barcode, and an associated location, such as x,y coordinates (where x is generally a direction parallel to an aisle and y is orthogonal to it), a position on an aisle, or a position on a predefined path, such as a walking path through the store. In some embodiments, the store profile may include a photographic panorama of a part of the store generated from a set of captured images, or a graphical representation generated therefrom.

Figure 1:
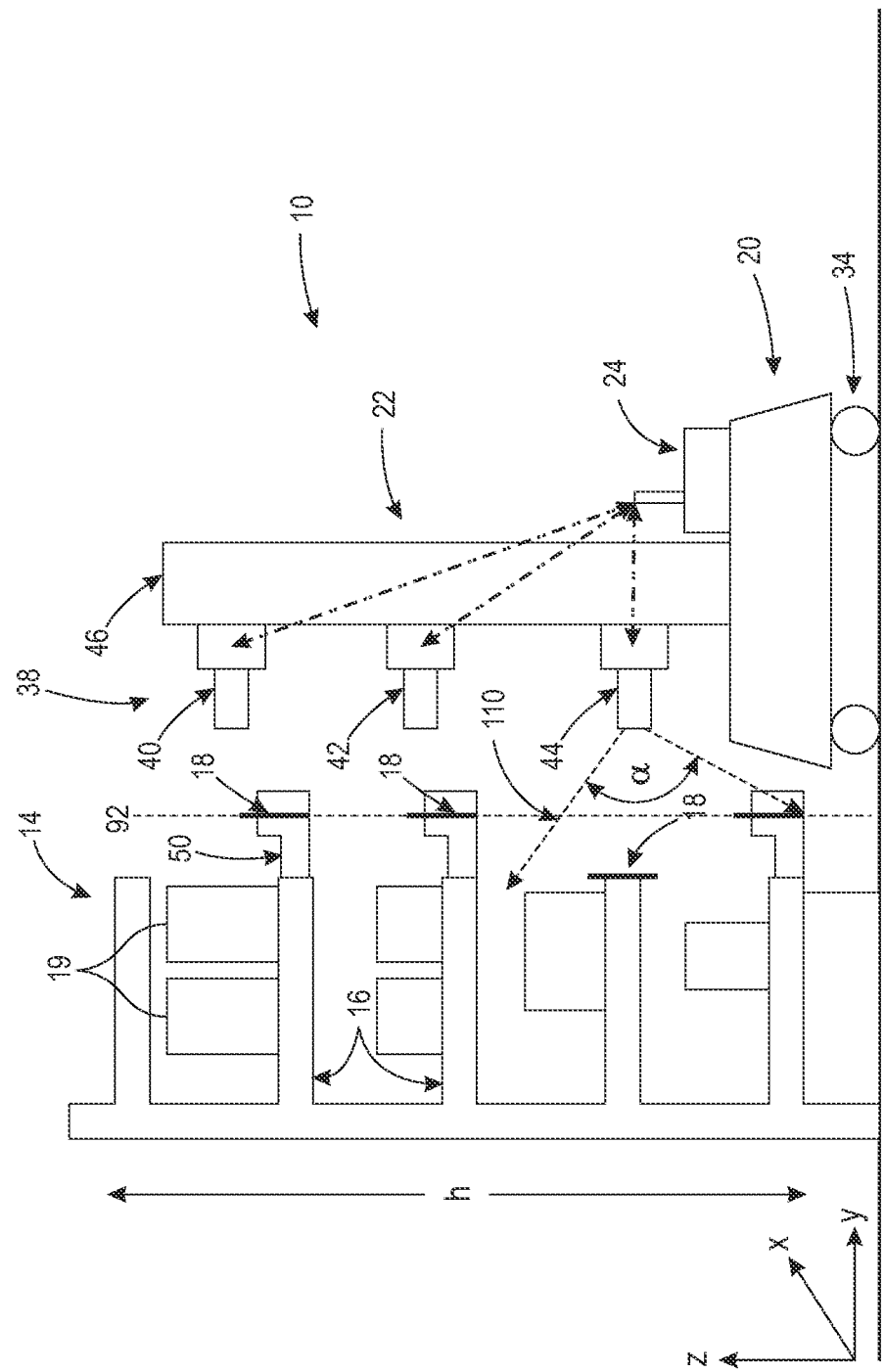
FIG. 1 is a schematic elevational view of a store profile generation system in accordance with one aspect of the exemplary embodiment.
Figure 2:
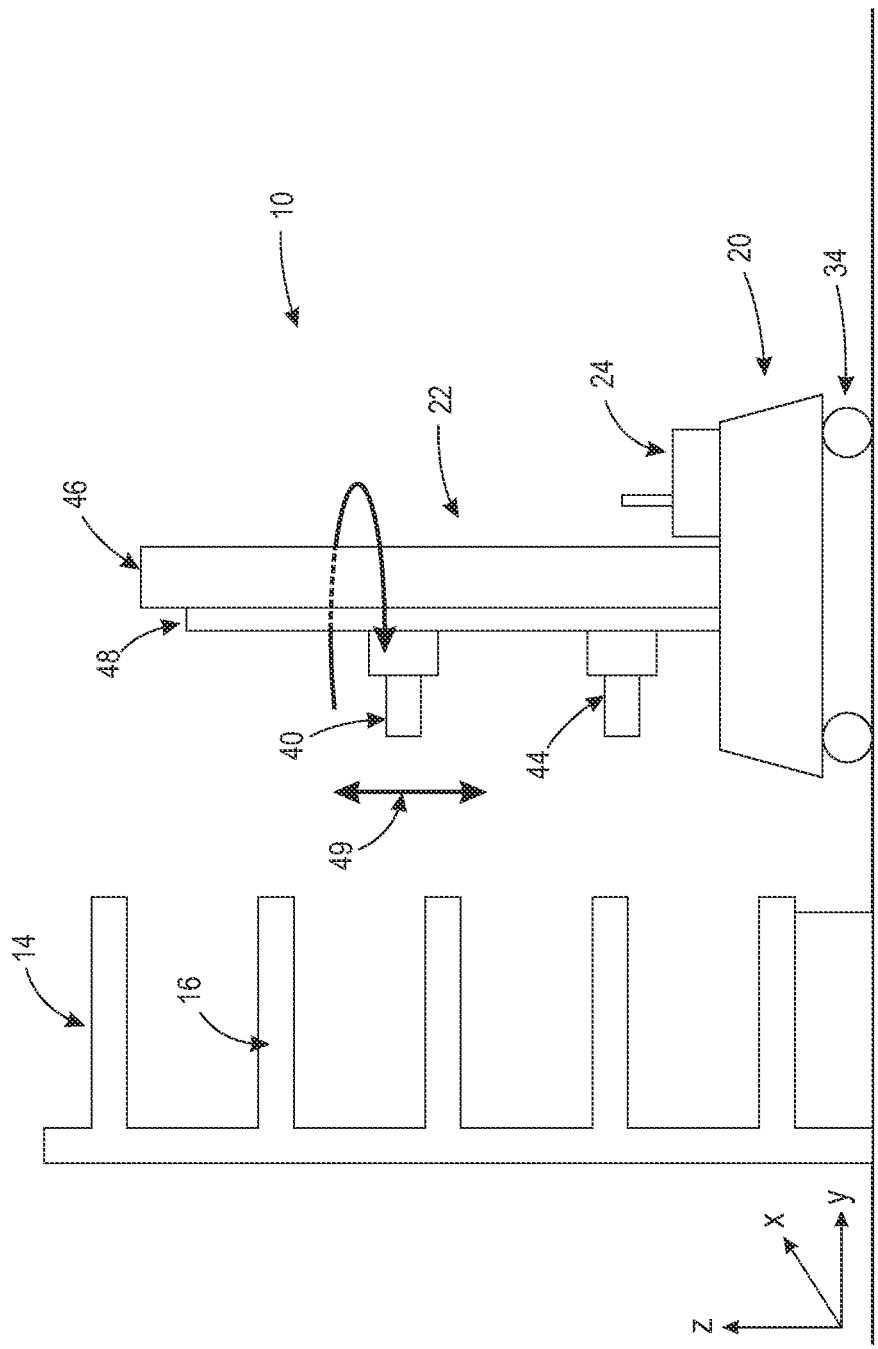
FIG. 2 is a schematic elevational view of a store profile generation system in accordance with another aspect of the exemplary embodiment.

The store profile 12 is generated by capturing images of product display units 14, such as store shelf units, at appropriate locations with appropriate imaging resolutions. As illustrated in FIG. 1, each shelf unit 14 may include two or more vertically-spaced shelves 16, to which product labels 18, such as product price tags, displaying product-related information, are mounted, adjacent related products 19. In the exemplary embodiments, the price labels are not on the products themselves, but on the shelf units, e.g., in determined locations. Thus for example, a portion of a shelf which is allocated to a given product may provide for one (or more) price labels to be displayed for that product. In other embodiments the product labels 18 may be displayed on an adjacent pegboard or be otherwise associated with the respective display unit 14.

The exemplary profile generation system 10 includes a mobile base 20, an image capture assembly 22, and a control unit 24, which are moveable as a unit around the product facility. The exemplary system 10 captures images within a product facility, such as a retail store, with the image capture assembly 22 at a sequence of locations of the mobile base 20, extracts product-related data 26 (e.g., printed barcodes and/or text from the captured product price labels) and location information from the images and the mobile base location, and constructs a store profile 12 (e.g., a 2D map, as discussed above) which defines a spatial layout of locations of the shelf labels 18 within the store.

Figure 5:
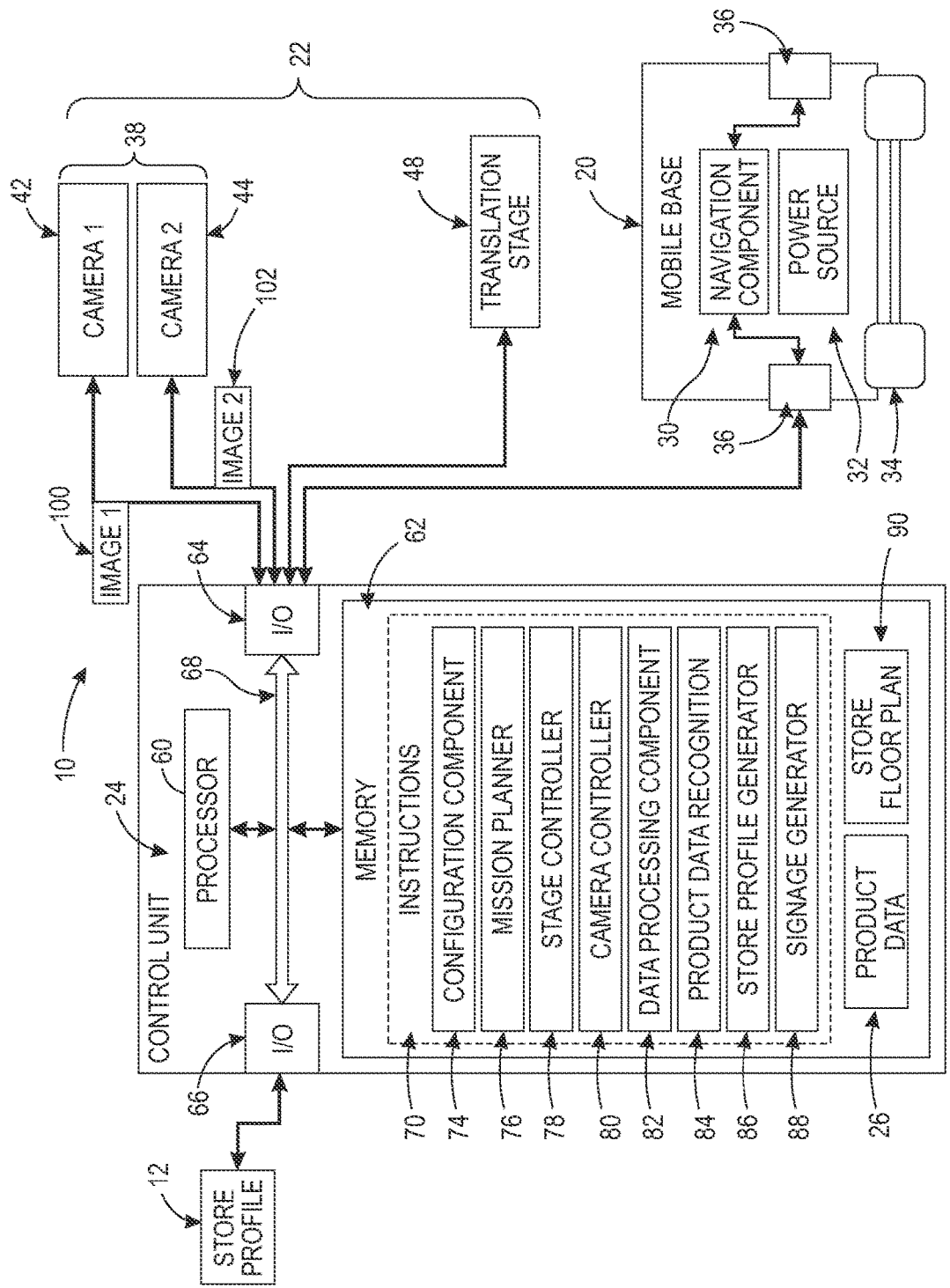
FIG. 5 is a functional block diagram of the store profile generation system of FIGS. 1-4 in accordance with one aspect of the exemplary embodiment.

The mobile base 20 serves to transport the image capture assembly 22 around the product facility and may be fully-autonomous or semi-autonomous. In one embodiment, the mobile base 20 is responsible for navigating the system 10 to a desired location with desired facing (orientation), as requested by the control unit 24, and reporting back the actual location and facing, if there is any deviation from the request. As illustrated in FIG. 5, in a fully-autonomous mode, the motorized mobile base 20 may include a navigation component 30 and an associated power source 32, such as a battery, motor, drive train, etc., to drive wheels 34 of the of the mobile base in order to move the system 10 to a desired location with desired facing according to a request from the control unit 24. The navigation component 30 may be similarly configured to the control unit 24 and may include memory and a processor for implementing the instructions provided by the control unit and reporting location and orientation information back to the control unit. Position and/or motion sensors 36 provide the navigation component 30 with sensing capability to confirm and/or measure any deviation from the requested location and orientation. These may be used by the navigation component for identifying the location, orientation, and movement of the mobile base for navigation and for store profile generation by the control unit. One suitable mobile base which can be adapted to use herein is a Husky™ unmanned ground vehicle obtainable from Clearpath Robotics Inc., 148 Manitou Dr., Kitchener, Ontario N2C 1L3, Canada, which includes a battery-powered power source.

In a semi-autonomous mode, the mobile base 20 is pushed by a person (e.g., as a cart), and thus the power source and optionally also the navigation component may be omitted. In some embodiments, the navigation component and sensors may be used in the semi-automated mode to confirm and/or measure any deviation from a requested location and orientation (e.g., by using voice feedback to confirm the aisle/shelf information or using image features of the scene).

The image capture assembly 22 includes an imaging component 38 which includes one or more image capture devices, such as digital cameras 40, 42, 44, that are carried by a support frame 46. The image capture devices capture digital images, such as color or monochrome photographic images. The support frame may be mounted to the mobile base 20 and extend generally vertically (in the z-direction) therefrom (for example, at an angle of from 0-30° from vertical, such as from 0-20° from vertical). The cameras are configured to capture images of a full height h of the shelf unit, or at least that portion of the height h in which the labels 18 of interest are likely to be positioned throughout the facility.

Figure 3:
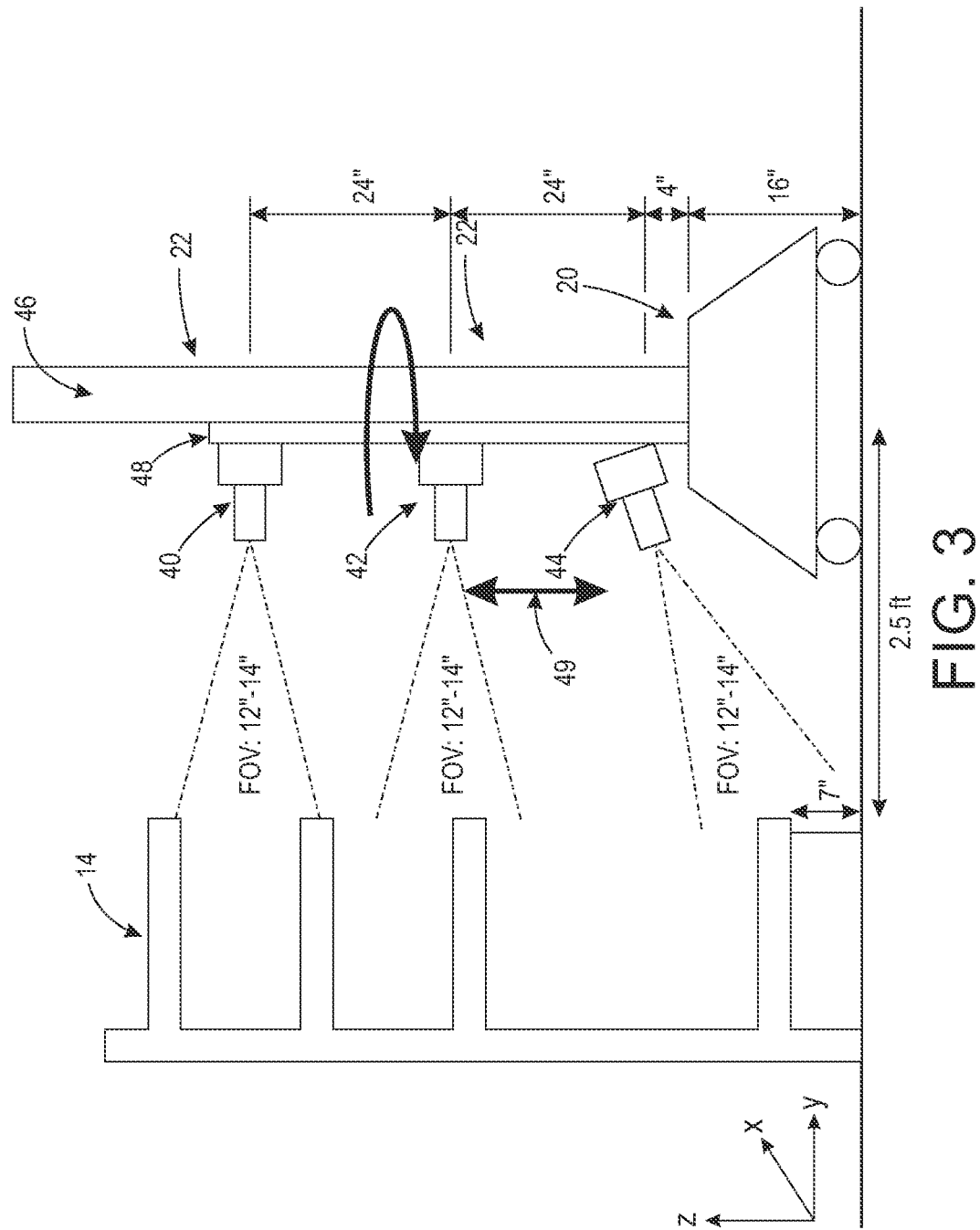
FIG. 3 is a schematic elevational view of a store profile generation system in accordance with another aspect of the exemplary embodiment.
Figure 4:
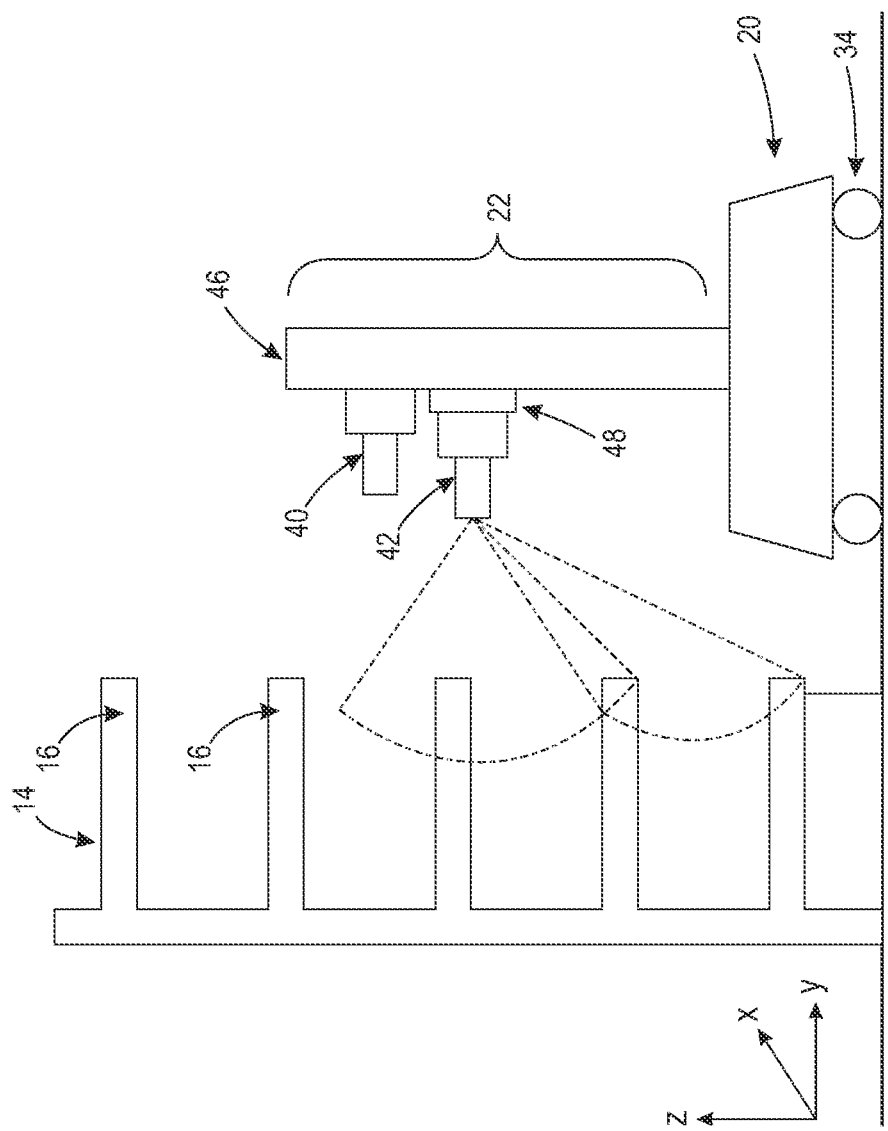
FIG. 4 is a schematic elevational view of a store profile generation system in accordance with another aspect of the exemplary embodiment.

One or more of the camera(s) 40, 42, 44 may be moveable, by a suitable mechanism, in one or more directions, relative to the support frame 46 and/or mobile base 20. In one embodiment, at least one of the cameras has a first position and a second position, vertically-spaced from the first position, allowing the camera to capture images in the first and second positions. In the embodiment illustrated in FIGS. 2 and 3, for example, the support frame 46 includes a translation stage 48 for moving one or more of the camera(s) in at least one direction, such as generally in the z (vertical) direction, as illustrated by arrow 49. The direction of movement need not be strictly vertical if the support translation stage is mounted to an angled support frame, as noted above. Optionally, the translation stage 48 provides for rotation of one or more of the cameras in the x, y plane and/or tilting of one or more of the cameras, relative to the translation stage/support frame. In another embodiment, the cameras, and/or their associated mountings, may provide the cameras with individual Pan-Tilt-Zoom (PTZ) capability. The pan capability allows movement of the field of view (FOV) relative to the base unit in the x direction; the tilt capability allows the field of view to move in the z direction as illustrated for camera 44 in FIG. 3; the zoom capability increases/decreases the field of view in the x, z plane (which may be measured in units of distance, such as inches or cm, as illustrated in FIG. 3, or angle α, as illustrated in FIG. 1). In some embodiments, only some, i.e., fewer than all, of the cameras are moveable and/or have PTZ capability, as illustrated in FIG. 4, where only camera 42 has such capabilities. The incremental movement of the mobile base 20 allows images to be captured along the length of the shelf unit 14 (in the x direction).

Figure 6:
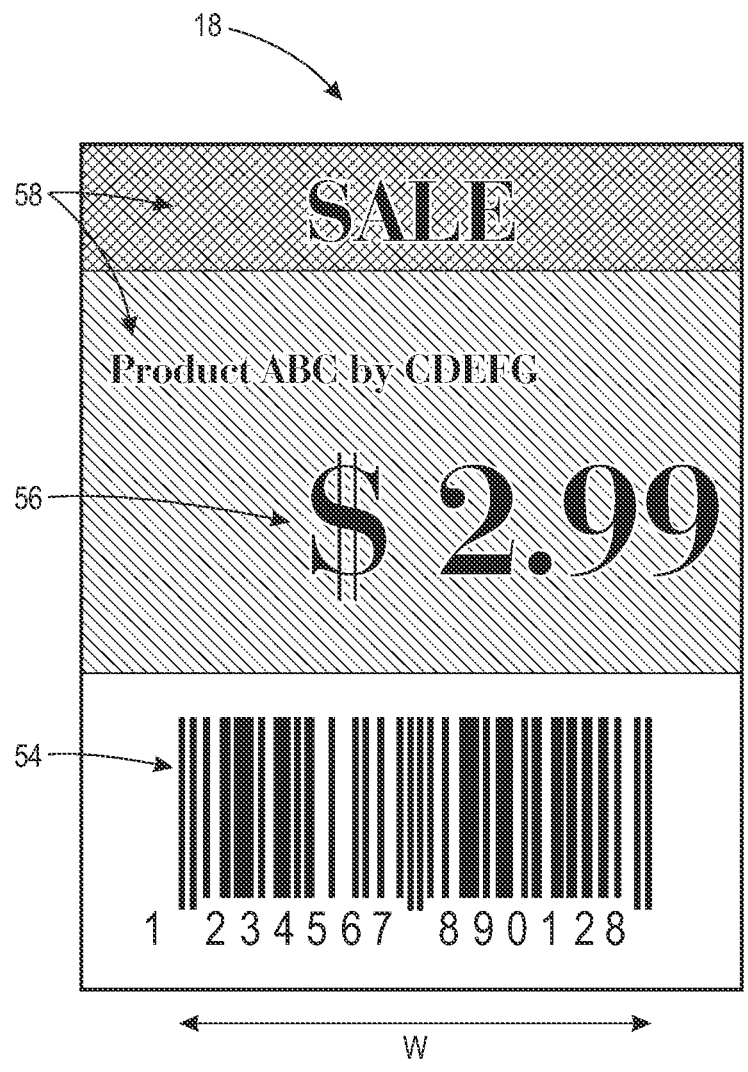
FIG. 6 illustrates an exemplary price tag.

The image capture assembly 22 serves to capture a series of images containing shelf product labels 18, such as product price tags, at sufficient resolution for analysis and product recognition. The product price or tags 18 may be located on the outer edge of a shelf or at the end of a pegboard hook 50, or other product label mounting device. As illustrated in FIG. 6, each price tag 18 generally includes a unique identifier 54 for the product, such as a 1 or 2-dimensional barcode or stock keeping unit (SKU) code. As an example, a 1D EAN-13 code may be printed on or otherwise affixed to the product label. 2D barcodes are commonly referred to as QR codes or matrix codes. In addition, a human-readable price 56 and optionally some descriptive text 58 may be printed on or otherwise affixed to the product label.

A width w of the barcode 54 in the y direction may be about 20-25 mm on many price tags. However, the barcode width may not be uniform throughout the store or from one store to another. In order to allow accurate imaging and decoding of such barcodes, a minimum resolution of approximately 200 pixels per inch (ppi) (78 pixels per centimeter) at the object plane with sufficient depth of focus to allow for differences in x direction position or tilt of the price tags relative to the camera is desirable. For smaller barcodes and 2D barcodes, a higher resolution may be appropriate. A digital camera mounted to a support frame 46 so that it can be relatively stationary while capturing images is thus more suited to this task than a hand-held smartphone camera or inexpensive webcams, unless the acquisition is performed close up (e.g., one barcode at a time with the camera placed very close to the barcode) and the camera is held sufficiently steady. Furthermore, although the locations of price tags are somewhat systematic, there are large variations from shelf to shelf, store to store, and chain to chain, as well as differences in lighting conditions, print quality, transparency of the product label mounting device 50 (if it overlays the product label 18), and so forth. Thus, it may be appropriate to change the design and/or adjust the configuration of the cameras, depending on the expected conditions within the store or portion thereof. An exemplary image capture assembly 22 is adaptable to accept different numbers of cameras and/or different camera capabilities, as described in further detail below.

The exemplary control unit 24 provides both control of the system and data processing. The control unit 24 includes one or more dedicated or general purpose computing devices configured for performing the method described in FIG. 7. The computing device may be a PC, such as a desktop, a laptop, palmtop computer, portable digital assistant (PDA), server computer, cellular telephone, tablet computer, pager, combination thereof, or other computing device capable of executing instructions for performing the exemplary method. As will be appreciated, although the control unit 24 is illustrated as being physically located on the mobile base 20 (FIG. 1), it is to be appreciated that parts of the control unit may be in the image capture assembly 22 or located on a separate computer remote from the mobile base and image capture assembly.

The control unit 24 illustrated in FIG. 5 includes a processor 60, which controls the overall operation of the control unit 24 by execution of processing instructions which are stored in memory 62 communicatively connected with the processor 60. One or more input/output interfaces 64, 66 allow the control unit to communicate (wired or wirelessly) with external devices. For example, interface 64 communicates with cameras 42, 44, 46 to request image capture, and/or adjustments to the PTZ settings, and to receive captured digital images from the cameras; with translation stage 48, where present, to adjust camera position(s); with mobile base 20 for movement of the system as a whole, relative to the shelf unit, and the like. Interface 66 may be used for outputting acquired or processed images, a store profile 12, and/or information extracted therefrom, such as to an external computing device and/or a printer (not shown) for printing and/or packaging sale signage in an appropriate order to match the store profile.

The various hardware components 60, 62, 64, 66 of the control unit 24 may be all connected by a bus 68.

The memory 62 may represent any type of non-transitory computer readable medium such as random access memory (RAM), read only memory (ROM), magnetic disk or tape, optical disk, flash memory, or holographic memory. In one embodiment, the memory 62 comprises a combination of random access memory and read only memory. In some embodiments, the processor 60 and memory 62 may be combined in a single chip. The interface 66, 68 allows the computer to communicate with other devices via a wired or wireless links or by a computer network, such as a local area network (LAN) or wide area network (WAN), or the internet, and may comprise a modulator/demodulator (MODEM), an electrical socket, a router, a cable, and and/or Ethernet port. Memory 62 stores instructions for performing the exemplary method as well as the processed data 12.

The digital processor 60 can be variously embodied, such as by a single-core processor, a dual-core processor (or more generally by a multiple-core processor), a digital processor and cooperating math coprocessor, a digital controller, or the like. The digital processor 60, in addition to controlling the operation of the computer 62, executes instructions stored in memory 62 for performing the method outlined in FIGS. 7 and/or 11.

The term "software," as used herein, is intended to encompass any collection or set of instructions executable by a computer or other digital system so as to configure the computer or other digital system to perform the task that is the intent of the software. The term "software" as used herein is intended to encompass such instructions stored in storage medium such as RAM, a hard disk, optical disk, or so forth, and is also intended to encompass so-called "firmware" that is software stored on a ROM or so forth. Such software may be organized in various ways, and may include software components organized as libraries, Internet-based programs stored on a remote server or so forth, source code, interpretive code, object code, directly executable code, and so forth. It is contemplated that the software may invoke system-level code or calls to other software residing on a server or other location to perform certain functions.

Figure 7:
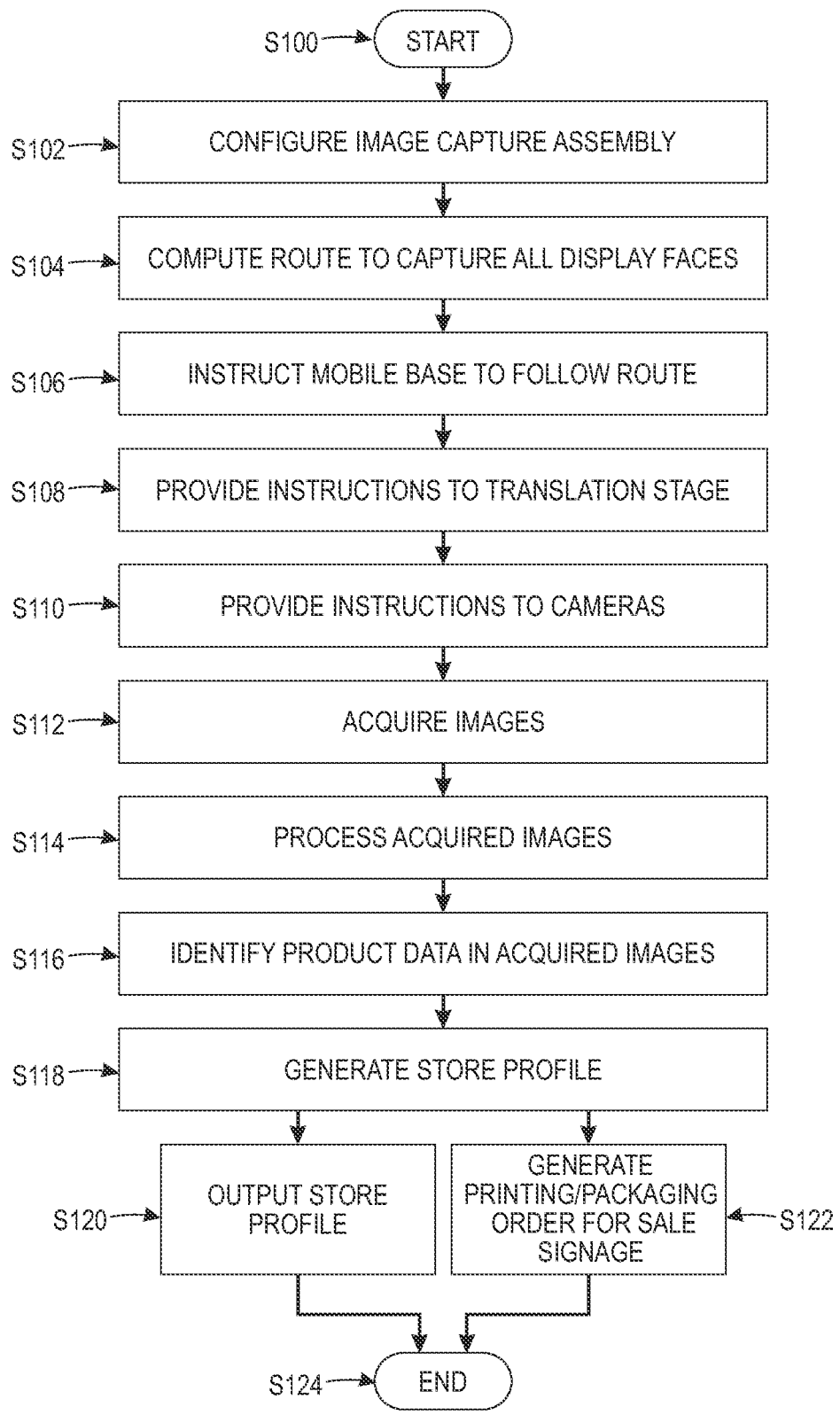
FIG. 7 is a flow chart illustrating a store profile generation method in accordance with another aspect of the exemplary embodiment.

The processor 60 executes instructions 70 stored in memory 62 for performing the method outlined in FIGS. 7 and/or 11. In the illustrated embodiment, the instructions include a configuration component 74, a mission planner 76, a translation stage controller 78, a camera controller 80, an image data processing component 82, a product data recognition component 84, a store profile generator 86, and a signage generator 88. Fewer than all these components may be included in some embodiments. In other embodiments, some or all of the components may be located on a separate computing device, i.e., one which is not carried by the mobile base, as discussed above.

The configuration component 74 is used prior to a mission to configure the image capture assembly 22 (e.g., determine FOV and position(s) of the camera(s) and to provide a spatial characterization of the image capture assembly, such as a spatial profile for each camera. Each camera may have at least one camera spatial profile. A camera may have two or more spatial profiles if the camera is to be moved, relative to the mobile base, and/or its FOV adjusted, for acquiring more than one image at the same mobile base location. The camera spatial profile may be a mapping between pixel location and a location in an x, z plane to enable a mapping between pixels of each image captured at a respective camera position and a position in the x, z plane corresponding to a portion of a shelf face where the images are captured.

The mission planner 76 has access to a store floor plan 90 (layout of aisle and shelves and its facing) and the purpose of each mission. A mission may be for example, to capture all price tags throughout the store, or limited to only a part of the store, etc. Using the information in the store floor plan 90, the mission planner determines the path that the mobile base 20 should follow and communicates with the mobile base to provide the path and appropriate stop positions (where the images should be acquired by the image capture assembly). The instructions may be provided to the mobile base in a step-by-step fashion or in the form of a full mission.

The translation stage controller 78 determines the translations of the translation stage to achieve desired camera positions and communicates them to the translation stage 48. The camera controller 80 determines the camera parameters (e.g., shutter speed, aperture, ISO number, focal length, . . . ) and optionally position parameters (e.g., pan, tilt, zoom, or vertical translation amount . . . ) of the cameras in the image capture assembly for each position that requires image acquisition. These parameters may be fixed throughout the mission and/or adjusted dynamically based on current location information of the mobile base (e.g., distance to the shelf to be imaged, the facing angle, height of the shelf . . . ). As will be appreciated, translation stage controller 78 and camera controller 80 may form parts of a single component for controlling the acquisition of images by the image capture assembly 22.

The image data processing component 82 processes the images acquired by all the cameras and uses the mapping provided by the configuration component and position information provided by the mobile base to map pixels of the captured image to locations in 3D space.

The product data recognition component 84, which may be a part of the image data processing component 82, analyses the processed images for detecting price tag locations, extracting product data 26, such as price tag data, and performs image coordinate conversion (from pixel position to real-world coordinates).

Outputs of the data processing component 82 and/or product data recognition component 84 may be used by the store profile generator 88 to determine the store profile 12 (e.g., the real-world coordinates of detected and recognized UPC codes). In some cases, outputs of the data processing component 82 and/or product data recognition component 84 are used by the translation stage controller 78 and/or camera controller 80 to determine what should be the appropriate camera parameters and/or position parameters for the next image capture. Some outputs of the data processing component 82 and/or product data recognition component 84 may be used by the mission planner 76 to determine the next positional move for the mobile base 20.

With reference now to FIG. 7, a method for generating (and using) a store profile 12 is shown, which can be performed with the system of FIGS. 1-5. As will be appreciated, some or all of the steps of the method may be performed at least partially manually and need not be performed in the order described. The method begins at S100.

At S102, the image capture assembly 22 is configured. Briefly, the configuration component 74 identifies suitable positions for the cameras 42, 44, 46, and optionally a suitable range of camera parameters (e.g., field of view, exposure time, ISO number, etc.), in order to capture the full height h of each shelf unit face from a set of overlapping images acquired at one single position of the moveable base (i.e., without gaps in the z direction). The configuration component 74 optionally extracts information from test images which enables it to associate each (or some) pixels of a captured image with a point in yz space and/or to generate a spatial characterization of the image capture assembly which may include a spatial profile for each camera.

Figure 8:
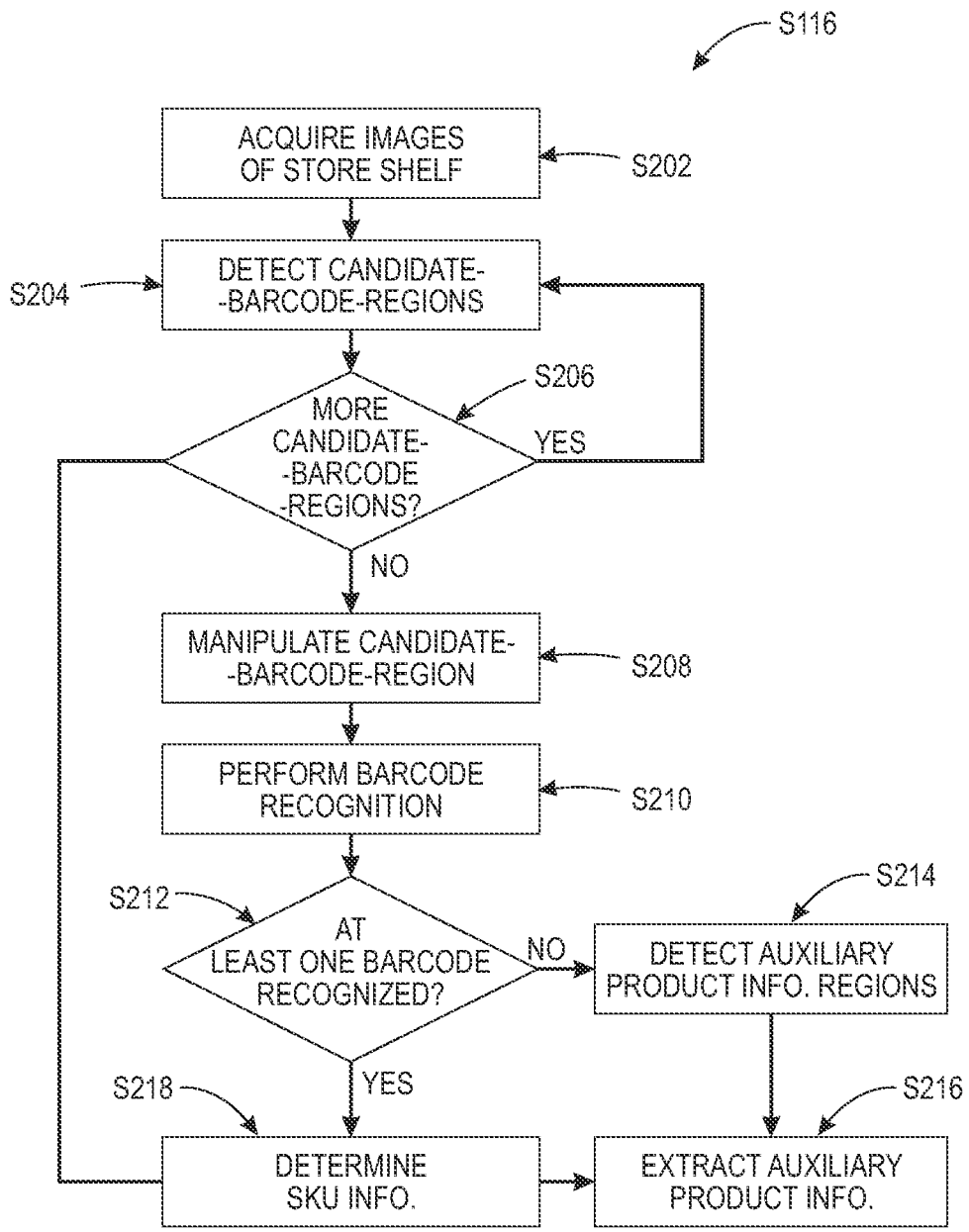
FIG. 8 is a flow chart illustrating a barcode and product label recognition method in accordance with one aspect of the exemplary embodiment.

At S104, a route for scanning the store shelves is computed. In particular, the mission planner 76 computes a route for the mobile base around the facility, based on a store floor plan 90. The floor plan identifies obstructions, particularly locations of shelf units. The store plan may have been generated partially automatically, from a prior traversal of the facility by the system 10, for identifying the location of obstructions. For example, as shown in FIG. 8, the obstructions may be identified on the floor plan 90 and locations of scannable faces 92 on each shelf unit identified (e.g., by a person familiar with the store). The mission planner 76 computes a route 94, which includes all the faces 92 and designates parts of the route as a scan path 96 (where images of scannable faces 92 are to be acquired) and parts of the route as a no-scan path 98 (where no images are to be acquired).

At S106, the mission planner 76 communicates the computed route 94 to the navigation component 30 of the mobile base, and optionally designating stop positions, which may be located at approximately equal intervals along the scan path 96. During the mission, the mission planner 76 receives information from the navigation component 30 from which any deviations to the planned route are computed. The mobile base 20 is then responsible for navigating the system 10 to a desired location with desired facing (orientation) requested by the control unit 24 and reporting back the actual location and facing if there is any deviation from the request.

At S108, as the mobile base 20 traverses the route 94, instructions are provided to the translation stage 48 at each predetermined stop on the scan path 96 for positioning the cameras. The translation stage controller 78 communicates instructions to the translation stage 48 when the camera position(s) is/are to be adjusted and may provide the translation stage 48 with directions for achieving predetermined camera positions, based on the information generated by the configuration component 74.

At S110, at each predetermined stop on the scan path 96, instructions are provided to the cameras 40, 42, 44 themselves for positioning and image acquisition. In particular, the camera controller 80 communicates instructions for adjusting position and/or focal plane to the camera's PTZ components and provides instructions for data acquisition to provide the optimal coverage of the shelf, using the position information identified by the configuration component 74. The translation stage controller 78 and camera controller 80 may work in cooperation to achieve desired positions of the cameras.

At S112 images 100, 102, are acquired by the cameras at a given position of the mobile base. The image capture assembly (iteratively) acquires images based on the requests by the control unit and the camera parameters and (optionally) position parameters provided.

At S114, the acquired images 100, 102 are transferred from the camera memory to the data processing component 82. The data processing component 82 receives the images acquired by the cameras and stores them in memory, such as memory 62, and may perform preliminary processing, such as adjustments for blur, color, brightness, etc. A composite image or panorama of the shelf face may be computed by performing a union of multiple images captured by the image capture assembly. In forming the composite image, pixels of one or more of the acquired images may be translated to account for each camera's spatial profile.

At S116, the product data recognition component 84 processes the acquired images 100, 102 or panorama to identify product data 26 from the captured shelf labels 18, where present, in the images. In an exemplary embodiment, the acquired images and a corresponding coarse location and facing information are analyzed to determine the product layout information (e.g., via barcode recognition of price tags and knowledge of the camera spatial profile).

The process repeats until the mission is completed (e.g., all aisles of interest have been scanned). For a typical mission, the mobile base moves along each store aisle to enable images of the scannable faces of each shelf unit to be captured. From the captured images, each shelf price tag is detected and its location determined within the image.

By measuring the mobile base's current position in the store floor plan, its position data can then be associated with the images being captured at that position, based on the time of capture. Candidate regions of each image 100, 102 which have at least a threshold probability of including a barcode 54 are identified and processed to extract the barcode information, which may be output as an SKU code which uniquely identifies the product. Associated information, such as price and product information 56, 58, particular colors used in the product label 18, and the like, may also be used to locate the barcode and/or to decipher it, particularly where the product data recognition component has difficulty in doing so based on the barcode alone. The location of the barcode in three dimensional space can be determined based on the location of the mobile base at the time the image was captured and the spatial characterization of the image capture assembly.

At S118, a store profile 12 is generated based on the identified barcode information 26 and computed barcode locations. In particular, the store profile generator 86 generates a store profile 12 which identifies locations of the price tags 18, based on the extracted barcode information and optionally information provided by one or more of the configuration component 74, mission planner 76, and navigation component 30, through which pixels of identified barcodes in the captured images are associated with a point in real (xyz or xy) space or otherwise generally located with respect to the store floor plan 90. An accurate store profile 12 identifying product locations/locations of price tags in a store can thus be reconstructed.

At S120, the store profile 12 may be output from the system.

At S122, information on signage to be mounted throughout the store may be received and a packaging order for the particular store computed, based on the store profile 12. In particular, the signage generator 88 receives information on signage to be printed for an upcoming sale in which only some but not all of the price tags may need to be replaced. The signage generator uses the store profile 12 to identify the locations of only the price tags/products to which the sale relates. From this information, a printing and/or packaging order for the signage is generated. When the signage is packaged and provided to an employee, the order in which the signage is packed in accordance with the computed printing and/or packaging order enables the person to traverse the store in the order in which the signage is packaged to replace/add the new signage, generally in a single pass through the store. The route defined by the packing order minimizes the amount of backtracking the employee needs to do and/or provides for a shorter path (in time or distance) to complete the task than would be achievable without the computed store-specific packaging order, and avoids the need for the store to resort the signage into an appropriate order. In this way, for each store in a chain, a store profile can be generated (e.g., periodically), allowing a store-specific packaging order for signage to be computed each time a set of shelf labels 18 and/or other signage is to be mounted throughout the store.

The method ends at S124.

Further details of the system and method will now be described.

While in one embodiment, the store profile 12 is used for defining an appropriate sequence for printing/packaging of sale signage, the store profile has other applications, including validating that the store product layout complies with a pre-defined planogram. A planogram is a predefined product layout for a slice of about 0.5 meters or more of length along an aisle. The captured images can also be processed to extract any 1D or 2D barcodes and/or text data from regions that comply with the price tag format. Data such as the product UPC and the price tag location within the image are extracted.

According to one aspect of this disclosure, provided is a method and system that goes beyond typical 1D barcode recognition to improve the recognition rate of identifying product labels, such as a Stock Keeping Unit (SKU) on shelf price-tags. The improvement is gained by utilizing sub-image manipulation and other, i.e., auxiliary, product information extraction. The method and system has broad usage in retail applications, including Shelf-Product Identification methods and systems as previously described with reference to FIGS. 1-7 above. See also U.S. patent application Ser. No. 14/303,809, filed Jun. 13, 2014, by Wu et al., and entitled "Store Shelf Imaging System". An exemplary method includes the following steps: (1) Acquire image(s) of the shelf in a store; (2) Detect/localize candidate barcode regions on the images; (3) Crop and manipulate each sub-image/candidate-barcode-region via standard image processing techniques to create modified versions of it; (4) Perform barcode recognition on modified versions of candidate-barcode-regions; (5) For those candidate-barcode-regions, where there is no successful barcode recognition yielded on all modified versions of them, determine and detect associated regions (referred as auxiliary product information regions) corresponding to regions with auxiliary product information based on the price-tag layout information; (6) Extract auxiliary product information on detected auxiliary product information regions; and (7) Determine possible product information, i.e., SKU, based on a combination of barcode recognition and auxiliary product information extraction.

Further details of the method and system for recognizing barcodes and/or product labels S116 will now be described with reference to FIGS. 8-11.

Acquire image(s) of the shelf in a store. S202

The disclosed method starts with acquired image(s) of the shelf in a retail store. As the images are acquired, they are processed for identifying the SKU of shelf-products. An example imaging system is shown in FIG. 8 and a high-level use case is further described in U.S. patent application Ser. No. 14/303,809, filed Jun. 13, 2014, by Wu et al., and entitled "Store Shelf Imaging System", as well as above.

Detect/localize candidate barcode regions on the images. S204

Figure 9:
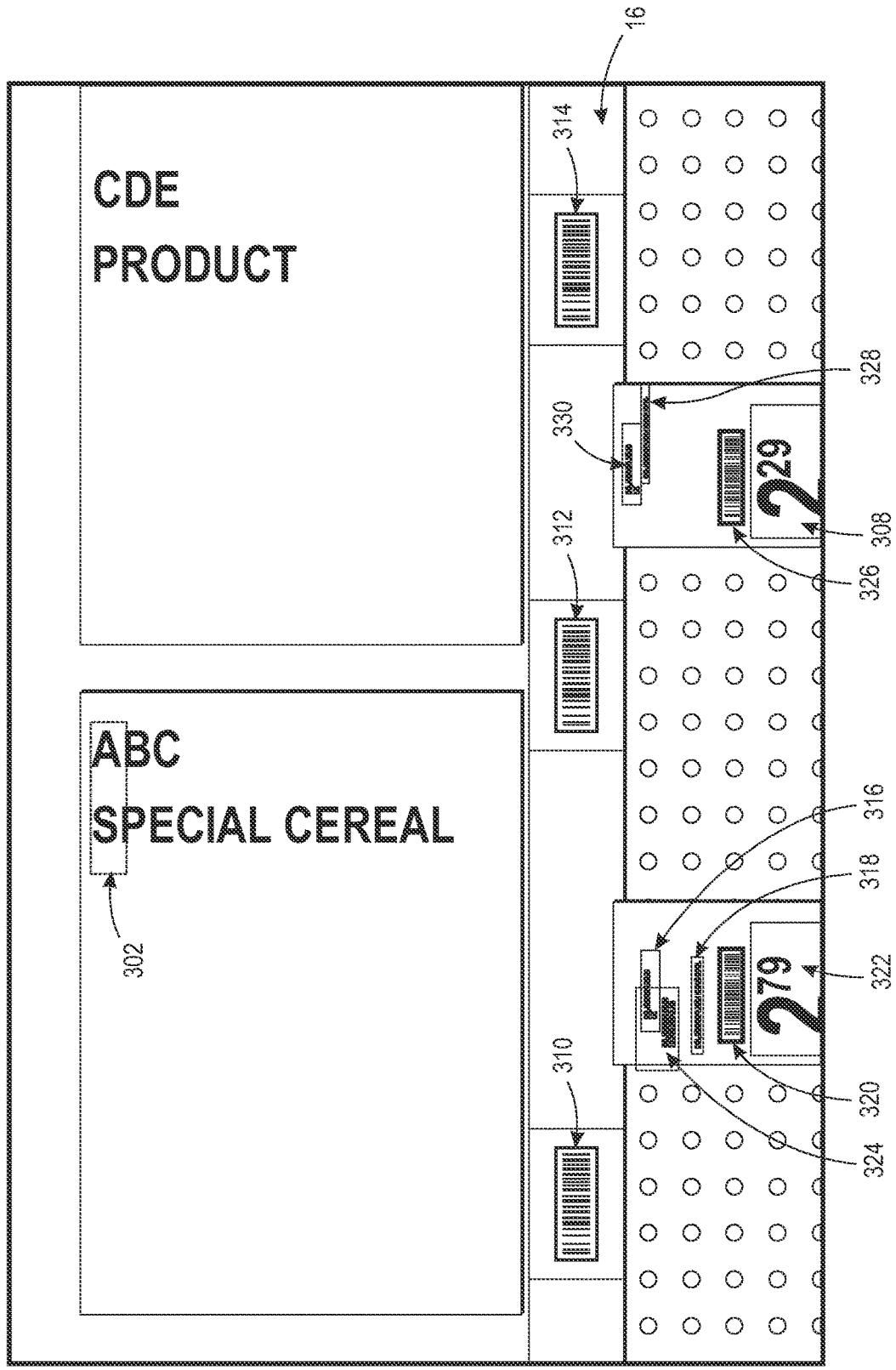
FIG. 9 illustrates an exemplary acquired image of a store shelf, including detected candidate barcode regions.

In this step, image analysis is performed on the acquired image to detect and localize candidate barcode regions for further processing. For example, see J. Liyanage, "Efficient Decoding of Blurred, Pitched, and Scratched Barcode Images," Second International Conference on Industrial and Information Systems (ICIIS 2007), August, (2007). According to the exemplary embodiment, a combination of average edge strength, average edge orientation, and morphological filtering are used for blob detection. The algorithm is biased to allow more false-positives, which will be removed in later processes, while penalizing false-negatives more severely. FIG. 9 shows the results of applying the algorithm on an example shelf image. As shown in FIG. 9, more false-positives 302, 316, 318, 324, 326, 328 and 330 are detected to ensure the detection of true positives 310, 312, 314, 320 and 326. These false-positives are easily removed during the barcode recognition step.

Figure 10:
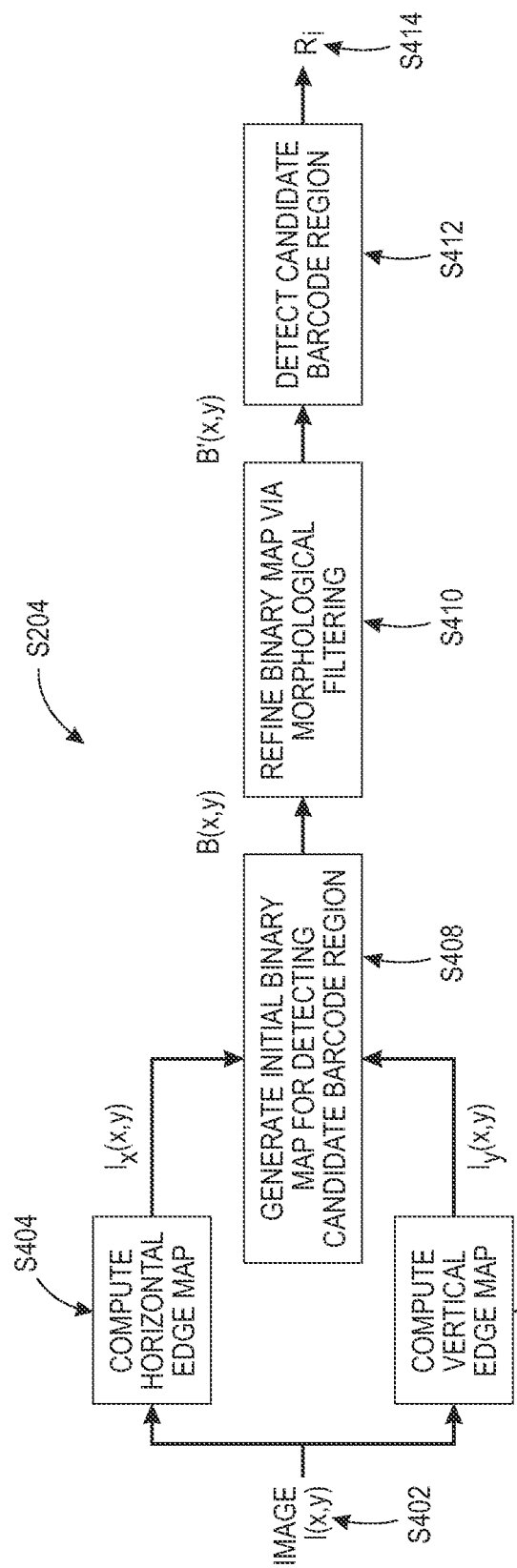
FIG. 10 is a flow chart illustrating a barcode region detection method in accordance with one aspect of the exemplary embodiment.

FIG. 10 shows an example embodiment of candidate 1-D barcode region detection S204 via edge properties. As an example, let I(x,y) represent the image intensity, e.g., gray or R or G or B, at position (x,y) S402. First, the horizontal edge map, $I_x(x,y)=I(x+1,y)-I(x-1,y)$ is computed S404. This can be achieved efficiently via a convolution operation between I(x,y) and a kernel [1–1]. Other gradient type kernel oriented horizontally can be used as well. Similarly, the vertical edge map is computed, $I_y(x,y)=I(x,y+1)-I(x,y-1)$ S406. This can be achieved efficiently via a convolution operation between I(x,y) and a kernel $[1-1]^T$. Other gradient type kernel oriented vertically can be used as well. Given the horizontal and vertical edge maps of the images, the candidate 1-D barcode regions, i.e., a set of regions with sufficient number of line strength, can then be detected using the following example approach.

First, an initial binary map is generated S408 indicating regions with sufficient edge strength and preferred orientation. As an example, the following rule can be applied for detection of 1-D barcode oriented horizontally, i.e., regions that may include several vertical-lines/strong-horizontal-edges:

$$B(x, y) = \begin{cases} 1 & \text{if } I_x(x, y) \geq \eta_1 \ \& I_x(x, y)/I_y(x, y) \geq \eta_2 \\ 0 & \text{otherwise} \end{cases}.$$

Similarly, the following rule can be applied for detection of 1-D barcode oriented vertically, i.e., regions that may include several horizontal-lines/strong-vertical-edges:

$$B(x, y) = \begin{cases} 1 & \text{if } I_y(x, y) \geq \eta_1 \ \& I_y(x, y)/I_x(x, y) \geq \eta_2 \\ 0 & \text{otherwise} \end{cases}.$$

To remove spurious noises in the binarization due to imperfect imaging, the binary map B(x,y) is refined using morphological filtering such as dilation or erosion to yield a better map B'(x,y) S410. The regions where B'(x,y)=1 are regions that are likely to have 1-D barcode based on the strength of edges and their orientation. It is thus possible to detect candidate 1-D barcode regions S412, $R_i$ S414, using connected-component analyses to determine which set of pixels belong to the same region, size thresholding to keep only the regions that are within certain size ranges based on the expected size of barcode, etc. Note that the resulting number of regions, $R_i$, is image dependent, where some may have many while some may have none, and η-dependent. Since it is preferred to have false-positives over having false-negatives (misses) as explained earlier, typically, smaller values are chosen for $\eta_1$ & $\eta_2$.

Note that other edge-based methods or pattern matching methods can be applied here to detect candidate barcode region as well. Also, the exemplary embodiment described herein uses 1-D barcode detection as an example, though it can be easily extended for 2-D barcode as well. For example, the use of orientation of edges could be removed and replaced with a compactness measure in two-dimensions if the goal is detecting 2-D barcodes rather than 1-D barcodes.

Crop and manipulate each sub-image/candidate-barcode-region via standard image processing techniques to create modified versions of it. S208

For each detected candidate-barcode-region S204, perform standard image processing techniques to create modified versions of the detected candidate-barcode-region. Appropriate image manipulations may include contrast enhancement, tone-curve reshaping, e.g., gamma-correction, sharpening, de-blurring, morphological filtering especially erosion, etc. See Charles A. Poynton (2003). Digital Video and HDTV: Algorithms and Interfaces. Morgan Kaufmann. pp. 260, 630. ISBN 1-55860-792-7; Charles Poynton (2010). Frequently Questioned Answers about Gamma; Erik Reinhard, Wolfgang Heidrich, Paul Debevec, Sumanta Pattanaik, Greg Ward, and Karol Myszkowski (2010). High Dynamic Range Imaging: Acquisition, Display, and Image-Based Lighting. Morgan Kaufmann. p. 82. ISBN 9780080957111; McKesson, Jason L. "Linearity and Gamma—Chapter 12. Dynamic Range". Learning Modern 3D Graphics Programming. Retrieved 11 Jul. 2013; and Gonzalez and Woods, "Digital Image Processing", $3^{rd}$ Edition, 954 pages. The objective of this step is to improve "image quality" so that the barcode recognition rate increases. In prior arts, this step is typically used to manipulate the entire image, and the image processing is typically selected intelligently based on some additional analysis or modeling. That approach is ideal if the root-cause of image degradation is somewhat known or identifiable. This is often not feasible in practice. Alternatively, some prior arts use adaptive thresholding in detecting candidate barcode region to alleviate the impact of poor quality imaging. However, it has been found that these are not enough in some applications to solve some practical issues. Fortunately, for many barcode recognition tasks, the outcome is fairly binary, i.e., recognized or not recognized. When a barcode is recognized, the probability that the decoded information is incorrect is very low due to the use of checksum and discrete widths/intensities. On the other hand, an algorithm is prone to miss barcodes when the detected candidate barcode region does not meet the encoded requirement, i.e., checksum rules and available discrete widths. Based on the binary nature associated with barcode recognition, the method disclosed herein manipulates the candidate-barcode-regions in an uninformed way, i.e., not intelligently, while covering a broad range of manipulation space. The barcode recognition step then serves as the selector knowing that if a barcode is recognized, it is most likely that the decoded information is correct and indeed there is a barcode at that candidate-barcode-region. Importantly, this method only works for a binary task that is biased to high accuracy once recognized. For example, an optical character recognition (OCR) process will achieve less accurate results, since an "O" can be misread as "0", "8", etc., if inappropriate image manipulation is applied. Clearly, this step can be applied on the entire image rather than only candidate-barcode-regions. However, given a limited amount of computation resources, the method applies an order or more (10×) manipulations on all candidate-barcode-regions rather than those on an entire image. This assumes that the barcode detection step can perform well without these additional image manipulations and the entire image is not filled with barcodes. Both assumptions are true for the application of the disclosed barcode recognition method to product labels as described herein. Note that the original sub-image is retained as one of the "modified" versions for later processing, and the image manipulation and barcode recognition of each candidate-barcode-region can be performed in a sequential or a parallel fashion. For sequential processing, one image manipulation is performed on a candidate barcode-region which is then passed to the barcode recognition step S210. If the modified version is recognized as including a barcode, the sequential process stops. If not, the sequential process continues until a barcode is recognized or until all image manipulations processes have been tested without success. For a parallel process, all image manipulations are performed on a candidate-barcode-region first, and all of the modified versions are passed to the barcode recognition process 210. Finally, the recognition results are the union of the individual results. The latter approach has the disadvantage of some waste in computation, but has the advantage of a simpler system architecture. Since all processes, i.e., image manipulation and barcode recognition, are done at sub-image levels the waste is negligible in practice.

Perform barcode recognition on modified versions of candidate-barcode-regions. S210

In this step, barcode recognition is performed on the modified versions of sub-images for each candidate-barcode-region using conventional barcode recognition algorithm(s). The final barcode recognition result for each candidate-barcode-region is the fusion of all results on its corresponding modified versions. One fusion method is to use the union of all results. For example, assume three modified versions were recognized as including the barcodes 0123456 and 0123458, and the third barcode was not recognized. Then, the final result is: recognized with 0123456 and recognized with 0123458. Based on an implementation of an exemplary barcode recognition method, most of the time, at most one barcode is recognized for each modified version; and if recognized they all have the same decoded information. In rare cases, where more than one barcode is recognized for one candidate-barcode-region, the union operation keeps all of them. Another fusion method is to simply keep the barcode with the highest confidence score. According to the exemplary embodiment, the fusion method is utilized since tests indicated that the barcode detection disclosed herein rarely detects more than one barcode in one candidate-barcode-region. Also, some candidate-barcode-regions have no barcode detected due to the false-positive bias imposed on the barcode detection algorithm.

For those candidate-barcode-regions where there is no successful barcode recognition yielded on all modified versions of them, determine and detect associated regions, referred as auxiliary product information regions, corresponding to regions with auxiliary product information based on the price-tag layout information S214.

Figure 11:
FIG. 11 illustrates exemplary price tags, i.e., product label.

In this step, determine and detect associated regions, referred to as other/auxiliary product information regions, corresponding to regions with auxiliary product information based on the price-tag layout information. This step is performed only for those candidate-barcode-regions where there is no successful barcode recognition yielded on all modified versions of the candidate-barcode-regions. The basic idea is as follows. For most price-tags in a retail environment, there is additional product information beyond the machine readable barcode. The additional product information can be helpful to narrow down possible SKU's even if the barcode recognition fails for the particular price-tag. Notably, in a typical retail setting it is much easier to detect and recognize barcode than to detect auxiliary product information regions and decipher the corresponding product information. Furthermore, barcode information is mostly unique while the additional product information may not be. Nonetheless, the detection of additional product information can be helpful if feasible. Fortunately, for a typical retail store there are only a minimum number of price-tag templates. Therefore, it is easier to detect auxiliary product information regions on the price-tag once its barcode-region is detected. Additionally, a skew/rotation correction can be applied to these detected auxiliary product information regions based on an estimated orientation of the corresponding detected barcode-region. FIG. 11 shows example price-tag layouts 420, 422, 424 and 426 commonly seen in retail store. Common elements are: product SKU in the form of 1D barcode (EAN-13, UPC) and in the form of text, price (text), product information (text). For on-sales tag, additional information in the form of text such as "Save XX¢", "NEW PRICE", "ENDS APRIL 22", "SALE", . . . is also quite common; and there is often saturated color patch (red, yellow, etc.) on the on-sales price-tags. These are all good candidate auxiliary product information regions for this detection. A limited number of price-tag templates available makes it feasible to determine and detect these regions robustly.

Extract auxiliary product information on detected auxiliary product information regions. S216

In this step, auxiliary product information is extracted from those detected auxiliary product information regions. The extraction algorithms are price-tag dependent while each individual extraction algorithm is mostly known and available. Hence, one of the tasks of this step is to select appropriate extraction algorithms for a given set of possible price-tag layout for analyzing these auxiliary product information regions. Below are a few example/typical extraction algorithms for this step:

Optical Character Recognition (OCR) for extracting text information

Color patch detection for sales-tag detection (red-tag, yellow-tag, etc.)

Logo detection for extracting informative image element such as logo, thumbnail, marker etc.

Template matching for extracting keywords in image form such as "SAVE", "SALE", "NEW PRICE", etc.

Clearly, a very capable OCR engine is available, the entire price-tag region can be inputted to the OCR engine to extract all text-information. However, this has been found to be not effective, i.e., either not accurate enough or too computational expensive. The exemplary embodiment provided herein identifies text-form sub-elements, e.g., text form of SKU information, price, "SAVE XX¢", in isolation and runs OCR engines on each text-form sub-element instead. This helps in two ways: (1) it simplifies the segmentation process during OCR and (2) it allows the OCR to run in an informed manner. It has been found that running an OCR engine in a single text line mode performs better than in document mode, which can have multiple lines of text. It has also been found that when performing OCR on the text form of SKU information, the performance is better if the OCR engine knows that only "digits" are allowed in the given line of text.

Determine possible SKU information based on a combination of barcode recognition and auxiliary product information extraction. S218

In this step, the final SKU information is determined based on a combination of the barcode recognition and auxiliary product information extraction for each candidate-barcode-region. For each candidate-barcode-region, if at least one barcode is recognized, the final result is from the barcode recognition step, i.e., detected location and decoded information, and the entire auxiliary product information extraction process is skipped. Note that the SKU information under this situation is very accurate as discussed before. Alternatively, if there is no barcode recognized for the candidate-barcode-region, this step uses all extracted auxiliary product information to narrow down possible SKU information and use that as the final estimated SKU information associated with the candidate-barcode-region. The accuracy under this situation is highly variable. Hence, also provided is a warning label and confidence score so that the users of this information are aware of the potential risk. For example, if in one of the missions of detecting all SKU information of a store, there is only one on-sales price-tag whose SKU is not detected by barcode recognition and our auxiliary product information extraction process concludes that a given candidate-barcode-region is an on-sale tag, then it is certain that the SKU must be the one that is missing from barcode recognition. However, if there are more than one unclaimed SKUs, then the use of an OCR result on the text-form of SKU information regions may be needed to further narrow the possibilities. The process can go even deeper depending on the practical situations of the application.

Notable differences of the disclosed method and system compared to the prior art are twofold: (1) use of broad-range image manipulations at sub-image levels and (2) use of auxiliary product information extraction. By performing image manipulations at sub-image levels, a large number of image manipulations (over-sampled trial-and-error strategy) are able to be applied and improvements are gained in the barcode recognition rate while keeping the additional computations relatively low. By using the layout knowledge of price-tags in a store, the method and system disclosed is able to better localize auxiliary product information and extract the product information that helps narrow down the possible SKU information where barcode recognition fails completely. Note that strategy (1) or strategy (2) can also be used independent of each other.

Some portions of the detailed description herein are presented in terms of algorithms and symbolic representations of operations on data bits performed by conventional computer components, including a central processing unit (CPU), memory storage devices for the CPU, and connected display devices. These algorithmic descriptions and representations are the means used by those skilled in the data processing arts to most effectively convey the substance of their work to others skilled in the art. An algorithm is generally perceived as a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be understood, however, that all of these and similar terms are to be associated with the appropriate physical quantities and are merely convenient labels applied to these quantities. Unless specifically stated otherwise, as apparent from the discussion herein, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The exemplary embodiment also relates to an apparatus for performing the operations discussed herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general-purpose systems may be used with programs in accordance with the teachings herein, or it may prove convenient to construct more specialized apparatus to perform the methods described herein. The structure for a variety of these systems is apparent from the description above. In addition, the exemplary embodiment is not described with reference to any particular programming language. It will be appreciated that a variety of programming languages may be used to implement the teachings of the exemplary embodiment as described herein.

A machine-readable medium includes any mechanism for storing or transmitting information in a form readable by a machine, e.g., a computer. For instance, a machine-readable medium includes read only memory ("ROM"); random access memory ("RAM"); magnetic disk storage media; optical storage media; flash memory devices; and electrical, optical, acoustical or other form of propagated signals, e.g., carrier waves, infrared signals, digital signals, etc., just to mention a few examples.

The methods illustrated throughout the specification, may be implemented in a computer program product that may be executed on a computer. The computer program product may comprise a non-transitory computer-readable recording medium on which a control program is recorded, such as a disk, hard drive, or the like. Common forms of non-transitory computer-readable media include, for example, floppy disks, flexible disks, hard disks, magnetic tape, or any other magnetic storage medium, CD-ROM, DVD, or any other optical medium, a RAM, a PROM, an EPROM, a FLASH- EPROM, or other memory chip or cartridge, or any other tangible medium from which a computer can read and use.

Alternatively, the method may be implemented in transitory media, such as a transmittable carrier wave in which the control program is embodied as a data signal using transmission media, such as acoustic or light waves, such as those generated during radio wave and infrared data communications, and the like.

It will be appreciated that variants of the above-disclosed and other features and functions, or alternatives thereof, may be combined into many other different systems or applications. Various presently unforeseen or unanticipated alternatives, modifications, variations or improvements therein may be subsequently made by those skilled in the art which are also intended to be encompassed by the following claims.

What is claimed is:

1. A method of identifying a plurality of barcodes associated with a plurality of respective product labels, the product labels including one or more barcodes and other non-barcode related product label information, the method comprising:
an image capturing device capturing an image of a plurality of product labels and storing the captured image in a memory operatively associated with the image capturing device;
a processor operatively associated with the memory detecting and localizing a plurality of barcode candidate regions within the captured image of the plurality of product labels;
the processor cropping the detected and localized plurality of barcode candidate regions to generate one or more respective sub-images of the captured image including images of the one or more barcode candidate regions, the sub-images including a region of the captured image defined by the size of a detected barcode within the respective barcode candidate region and excluding substantially all of the other product label information associated with the respective detected barcode;
the processor processing each sub-image using two or more independent image quality improvement processes to generate modified versions of each of the plurality of barcode candidate regions and respective detected barcodes within the respective barcode candidate regions;
the processor processing the modified versions of each of the plurality of barcode candidate regions using a binary process to decode readable barcodes included in each of the modified versions of each of the candidate barcode regions to generate a numerical representation of the readable barcodes and identifying barcode candidate regions including barcodes nondecodable using the binary process; and
for each of the plurality of barcode candidate regions including a nondecodable barcode,
the processor processing the captured image of the plurality of product labels to determine auxiliary product information regions including a greater number of pixels than the respective barcode candidate region including a nondecodable barcode;
the processor determining a price-tag layout associated with each of the auxiliary product information regions by matching the auxiliary product information regions with one or more reference price-tag templates including the physical layout of the other non-barcode related product information associated with each price-tag template;
the processor extracting the other non-barcode related product label information from the auxiliary product information regions based on a matched price-tag template; and
the processor determining a numerical representation of the nondecodable barcodes associated with each auxiliary product information region based on the extracted other non-barcode related product label information of the respective auxiliary product information region.

2. The method of identifying a barcode according to claim 1, wherein the two or more independent image quality improvement processes include one or more of contrast enhancement, tone-curve reshaping, gamma-correction, sharpening, de-blurring and morphological filtering.

3. The method of identifying a barcode according to claim 1, wherein the two or more independent image quality improvement processes are performed in serial or parallel.

4. The method of identifying a barcode associated with a product label according to claim 1, wherein the barcode is one of a 1D (Dimensional) and 2D barcode.

5. The method of identifying a barcode associated with a product label according to claim 1, further comprising:
associating each of the plurality of product labels including the respective decoded barcode with a physical location in a retail environment.

6. The method of identifying a barcode associated with a product label according to claim 5, wherein the step of detecting and localizing a plurality of barcode-candidate-regions within the captured image is biased to generate relatively more false-positives than false-negatives.

7. The method of identifying a barcode associated with a product label according to claim 1, further comprising:
fusing the decoded readable barcodes and identifying a respective product label based on the fusion.

8. An image processing system for identifying a plurality of barcodes associated with a plurality of respective product labels, the product labels including one or more barcodes and other non-barcode related product label information, the image processing system comprising:
an image capturing device; and
a memory operatively associated with the image capturing device,
a processor operatively associated with one or both of the image capturing device and memory,
the image capturing device configured to capture an image of a plurality of product labels and storing the captured image in the memory operatively associated with the image capturing device;
the processor configured to detect and localize a plurality of barcode candidate regions within the captured image of the plurality of product labels;
the processor configured to crop the detected and localized plurality of barcode candidate regions to generate one or more respective sub-images of the captured image including images of the one or more barcode candidate regions;
the processor configured to process each sub-image using two or more independent image quality improvement processes to generate modified versions of each of the plurality of barcode candidate regions;
the processor configured to process the modified versions of each of the plurality of barcode candidate regions to decode readable barcodes included in the modified versions of each of the candidate barcode regions; and for each of the plurality of barcode candidate regions including a nondecodable barcode,
the processor configured to process the captured image of the plurality of product labels to determine auxiliary product information regions including a greater number of pixels than the respective barcode candidate region including a nondecodable barcode;
the processor configured to determine a price-tag layout associated with each of the auxiliary product information regions by matching the auxiliary product information regions with one or more reference price-tag templates including the physical layout of the other non-barcode related product information associated with each price-tag template;
the processor configured to extract the other non-barcode related product label information from the auxiliary product information regions based on a matched price-tag template; and
the processor configured to determine a numerical representation of the nondecodable barcodes associated with each auxiliary product information region based on the extracted other non-barcode related product label information of the respective auxiliary product information region.

9. The image processing system according to claim 8, wherein the two or more independent image quality improvement processes include one or more of contrast enhancement, tone-curve reshaping, gamma-correction, sharpening, de-blurring and morphological filtering.

10. The image processing system according to claim 8, wherein the two or more independent image quality improvement processes are performed in serial or parallel.

11. The image processing system according to claim 8, wherein the barcode is one of a 1D (Dimensional) and 2D barcode.

12. The image processing system according to claim 8, further comprising:
associating each of the plurality of product labels including the respective barcode with a physical location in a retail environment.

13. The image processing system according to claim 12, wherein the step of detecting and localizing a plurality of barcode-candidate-regions within the captured image is biased to generate relatively more false-positives than false-negatives.

14. The image processing system according to claim 8, further comprising:
fusing the decoded readable barcodes and identifying a respective product label based on the fusion.

15. A method of performing product label identification, the product label including one or more barcodes and other product label information, the method comprising:
an image capturing device capturing an image of the product label and storing the captured image in a memory operatively associated with the image capturing device;
a processor operatively associated with the memory detecting and localizing one or more barcode candidate regions within the captured image of the product label;
cropping the detected and localized one or more barcode candidate regions to generate one or more sub-mages including the one or more barcode candidate regions;
processing each sub-image to decode readable barcodes included in the barcode candidate regions and identify barcode candidate regions including an unreadable barcode;
processing all or a portion of the captured image of the product label associated with the unreadable barcode to determine all or part of the other product label information association with the unreadable barcode;
comparing the determined other product label information to a plurality of product label templates to determine a layout associated with the product label including an unreadable barcode candidate region;
processing the captured image of the product label to extract all or part of the other product label information based on the determined layout associated with the product label; and
identifying the captured image of the product label as including one of a plurality of unique predefined product labels.

16. The method of performing product label identification according to claim 15, wherein an estimated orientation of a barcode candidate region associated with a nonreadable barcode is used to apply a correction to all or part of the captured image of the product label.

17. The method of performing product label identification according to claim 16, wherein the correction is associated with one or more of skew and rotation.

18. The method of performing product label identification according to claim 15, wherein the step of processing the captured image of the product label selects and uses one of a plurality of extraction algorithms based on the determined layout associated with the product label.

19. The method of performing product label identification according to claim 15, wherein the step of identifying the captured image of the product label includes associating a relative confidence value with the identification of the product label.

20. The method of performing product label identification according to claim 15, wherein the product label identification includes a SKU (stock keeping unit).

21. The method of performing product label identification according to claim 15, wherein the other product label information includes one or more SKU text, price text, product information text, logo, and color patch.

* * * * *